US008670794B2

(12) United States Patent
Kiran et al.

(10) Patent No.: US 8,670,794 B2
(45) Date of Patent: *Mar. 11, 2014

(54) SUPERPOSITION CODING IN A WIRELESS COMMUNICATION SYSTEM

(75) Inventors: Kiran Kiran, Pleasanton, CA (US); Naga Bhushan, San Diego, CA (US); Rashid Ahmed Akbar Attar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 12/860,218

(22) Filed: Aug. 20, 2010

(65) Prior Publication Data

US 2010/0316024 A1 Dec. 16, 2010

Related U.S. Application Data

(62) Division of application No. 11/567,609, filed on Dec. 6, 2006.

(60) Provisional application No. 60/794,874, filed on Apr. 24, 2006.

(51) Int. Cl.
*H04B 1/00* (2006.01)

(52) U.S. Cl.
USPC ........... 455/522; 455/450; 370/527; 370/329; 370/335; 359/34

(58) Field of Classification Search
USPC ......... 370/208, 335–337, 342–345, 347, 441, 370/442, 479, 480, 527, 529, 329; 375/140, 375/260, 267, 295, 347, 358; 455/39, 68, 455/69, 91, 102–105, 450, 509, 512, 513, 455/522; 359/34, 15
See application file for complete search history.

(56) References Cited

U.S. PATENT DOCUMENTS

| | | | |
|---|---|---|---|
| 5,805,634 A | 9/1998 | Sumner | |
| 6,259,685 B1 * | 7/2001 | Rinne et al. | 370/330 |
| 6,842,475 B2 | 1/2005 | Jeong et al. | |
| 6,917,603 B2 | 7/2005 | Strawczynski et al. | |

(Continued)

FOREIGN PATENT DOCUMENTS

| | | |
|---|---|---|
| CA | 2392574 A1 | 1/2004 |
| JP | 2005197765 | 7/2005 |

(Continued)

OTHER PUBLICATIONS cdma2000, 1xEV-DO, "cdma2000 High Rate Packet Data Air Interface Specification," TIA/EIA/IS-856, Version 2.0, Oct. 27, 2000.

(Continued)

*Primary Examiner* — Mahendra Patel
(74) *Attorney, Agent, or Firm* — S. Hossain Beladi

(57) ABSTRACT

The present patent application comprises a method and apparatus to compile a superposition coded packet by compiling user candidates for superposition coding, ranking the user candidates based on a result of an evaluation function, selecting a deserving user candidate from among the user candidates, and compiling a superposition coded packet by adding other user data packets to a packet of the deserving user data packet, wherein the data packets for the user candidates may conform to a plurality of different formats and wireless communication standards.

40 Claims, 22 Drawing Sheets

(56) References Cited

U.S. PATENT DOCUMENTS

| | | | |
|---|---|---|---|
| 6,952,454 | B1 | 10/2005 | Jalali et al. |
| 7,012,910 | B2 | 3/2006 | Takeuchi et al. |
| 7,254,365 | B2 * | 8/2007 | Chen .................. 455/13.3 |
| 7,277,492 | B2 | 10/2007 | Itoh |
| 7,280,562 | B2 | 10/2007 | Sindhushayana et al. |
| 7,411,895 | B2 | 8/2008 | Laroia et al. |
| 7,453,856 | B2 | 11/2008 | Guey |
| 7,464,166 | B2 | 12/2008 | Larsson et al. |
| 7,477,622 | B2 | 1/2009 | Attar et al. |
| 7,623,553 | B2 | 11/2009 | Bhushan et al. |
| 7,746,758 | B2 * | 6/2010 | Stolpman ............... 370/203 |
| 7,835,315 | B2 * | 11/2010 | Pi et al. ............... 370/312 |
| 7,920,884 | B2 | 4/2011 | Agrawal et al. |
| 8,050,224 | B2 | 11/2011 | Attar et al. |
| 8,085,819 | B2 | 12/2011 | Kiran et al. |
| 2002/0098860 | A1 | 7/2002 | Pecen et al. |
| 2003/0198209 | A1 | 10/2003 | Schwengler et al. |
| 2004/0229625 | A1 | 11/2004 | Laroia et al. |
| 2005/0058089 | A1 | 3/2005 | Vijayan et al. |
| 2005/0249177 | A1 | 11/2005 | Huo et al. |
| 2006/0009212 | A1 | 1/2006 | Kim et al. |
| 2006/0083205 | A1 * | 4/2006 | Buddhikot et al. ........ 370/338 |
| 2006/0094477 | A1 | 5/2006 | Rivera-Cintron et al. |
| 2006/0120321 | A1 | 6/2006 | Gerkis et al. |
| 2006/0171418 | A1 | 8/2006 | Casini et al. |
| 2006/0176881 | A1 | 8/2006 | Ma et al. |
| 2006/0268878 | A1 | 11/2006 | Jung et al. |
| 2006/0282740 | A1 | 12/2006 | Gu et al. |
| 2007/0060167 | A1 | 3/2007 | Damnjanovic et al. |
| 2007/0064692 | A1 | 3/2007 | Pi et al. |
| 2007/0110369 | A1 * | 5/2007 | Blauvelt et al. .............. 385/50 |
| 2007/0195907 | A1 | 8/2007 | Wang et al. |
| 2007/0211793 | A1 * | 9/2007 | Han .................. 375/150 |
| 2008/0019263 | A1 | 1/2008 | Stolpman |
| 2008/0102876 | A1 * | 5/2008 | Karlsson ............... 455/522 |
| 2011/0211561 | A1 | 9/2011 | Kiran et al. |

FOREIGN PATENT DOCUMENTS

| | | |
|---|---|---|
| JP | 2005323382 A | 11/2005 |
| JP | 2006014338 | 1/2006 |
| JP | 2006520558 | 9/2006 |
| JP | 2007511170 | 4/2007 |
| JP | 2008502225 T | 1/2008 |
| KR | 20060002771 | 1/2006 |
| WO | WO2005043844 A2 | 5/2005 |
| WO | 2005122425 | 12/2005 |
| WO | WO2006081574 A1 | 8/2006 |

OTHER PUBLICATIONS cdma2000, "High Rate Broadcast-Multicast Packet Data Air Interface Specification," TIA-1006-A, Version 2.0, Jul. 2005.
Cover, T.M. "Broadcast Channels" IEEE Transactions on Information Theory, IEEE Inc., New York, US, vol. IT-18, No. 1, Jan. 1972, pp. 2-14, XP000760860, ISSN: 0018-9448.
Huang, Defeng, et al., "Multiplexing Guard Intervals and Time Domain Pilots in OFDM Systems," International Conference on Consumer Electronics, 2001 Digest of Technical Papers, ICCE, Los Angeles, CA Jun. 19-21, 2001, New York, NY: IEEE, US, Jun. 19, 2001, pp. 68-69.
International Search Report and Written Opinion—PCT/US2007/067335, International Search Authority—European Patent Office, Jan. 25, 2008.
European Search Report—EP12157545—Search Authority—Munich—Jun. 12, 2012.
European Search Report—EP10176217—Search Authority—Munich—Apr. 27, 2011.
Karabulut et al.: "Rate design rule for superposition coded modulations", Electrical and Computer Engineering 2004, Canadian Conference on Niagara Falls, Ontario Canada May 2-5, 2004, p. 365-368 vol. 1, XP0107334662.
Taiwan Search Report—TW096114458—TIPO—Jun. 23, 2011.
Youjian et al.: "Optimal Rate Allocation for Superposition Coding in Quasi-static Fading Channels", Proceedings 2002 IEEE International Symposium on Informational Theory, IST 02 Lausanne, Switzerland, Jun. 30-Jul. 5, New York, NY, IEEE 2002, p. 111.

* cited by examiner

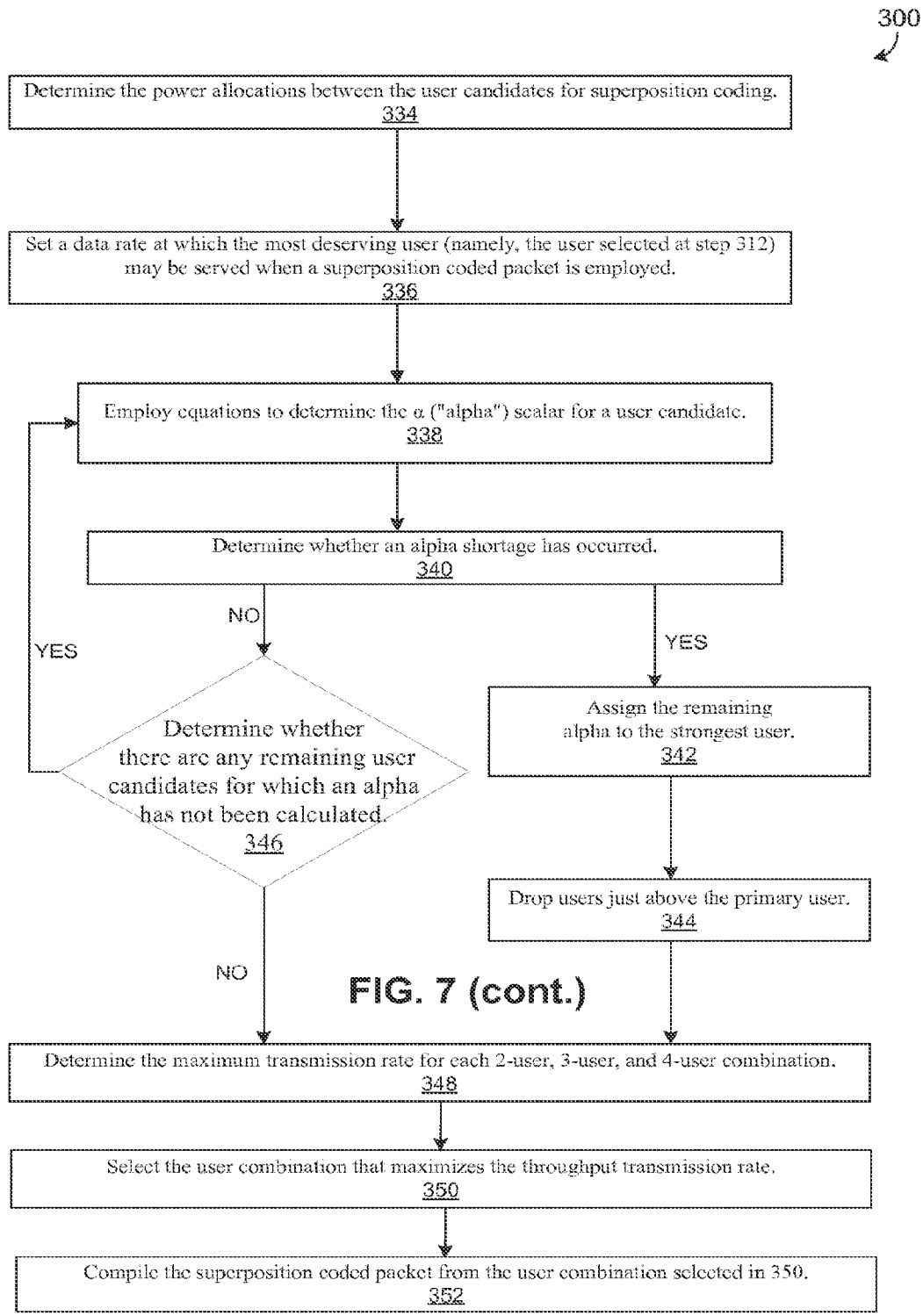

| USER | DRC(n) (kbps) | F(n) (-) |
|---|---|---|
| 202 | 475.7 | 45 |
| 204 | 3098.3 | 23 |
| 206 | 656.7 | 13 |
| 208 | 521.3 | 14 |
| 210 | 304.7 | 18 |
| 212 | 3408.2 | 11 |
| 214 | 598.7 | 14 |
| 216 | 520.7 | 17 |
| 218 | 501.1 | 20 |
| 220 | 2414.0 | 10 |
| 222 | 601.4 | 14 |
| 224 | 75.7 | 05 |
| 226 | 467.6 | 03 |
| 228 | 976.8 | 09 |
| 230 | 401.5 | 04 |
| 232 | 576.8 | 22 |
| 234 | 1356.6 | 12 |
| 236 | 38.6 | 07 |
| 238 | 533.9 | 15 |
| 240 | 656.7 | 08 |

FIG. 8A

| USER | DRC(n) (kbps) | F(n) (-) |
|---|---|---|
| 236 | 38.6 | 07 |
| 224 | 75.7 | 05 |
| 210 | 304.7 | 18 |
| 230 | 401.5 | 04 |
| 226 | 467.6 | 03 |
| 202 | 475.7 | 45 |
| 218 | 501.1 | 20 |
| 216 | 520.7 | 17 |
| 208 | 521.3 | 14 |
| 238 | 533.9 | 15 |
| 232 | 576.8 | 22 |
| 214 | 598.7 | 14 |
| 222 | 601.4 | 14 |
| 206 | 656.7 | 13 |
| 240 | 656.7 | 08 |
| 228 | 976.8 | 09 |
| 234 | 1356.6 | 12 |
| 220 | 2414.0 | 10 |
| 204 | 3098.3 | 23 |
| 212 | 3408.2 | 11 |

FIG. 8B

| USER | DRC(n) (kbps) | F(n) (-) |
|---|---|---|
| 202 | 475.7 | 45 |
| 204 | 3098.3 | 23 |
| 232 | 576.8 | 22 |
| 218 | 501.1 | 20 |
| 210 | 304.7 | 18 |
| 216 | 520.7 | 17 |
| 238 | 533.9 | 15 |
| 222 | 601.4 | 14 |
| 214 | 598.7 | 14 |
| 208 | 521.3 | 14 |
| 206 | 656.7 | 13 |
| 234 | 1356.6 | 12 |
| 212 | 3408.2 | 11 |
| 220 | 2414.0 | 10 |
| 228 | 976.8 | 09 |
| 240 | 656.7 | 08 |
| 236 | 38.6 | 07 |
| 224 | 75.7 | 05 |
| 230 | 401.5 | 04 |
| 226 | 467.6 | 03 |

FIG. 8C

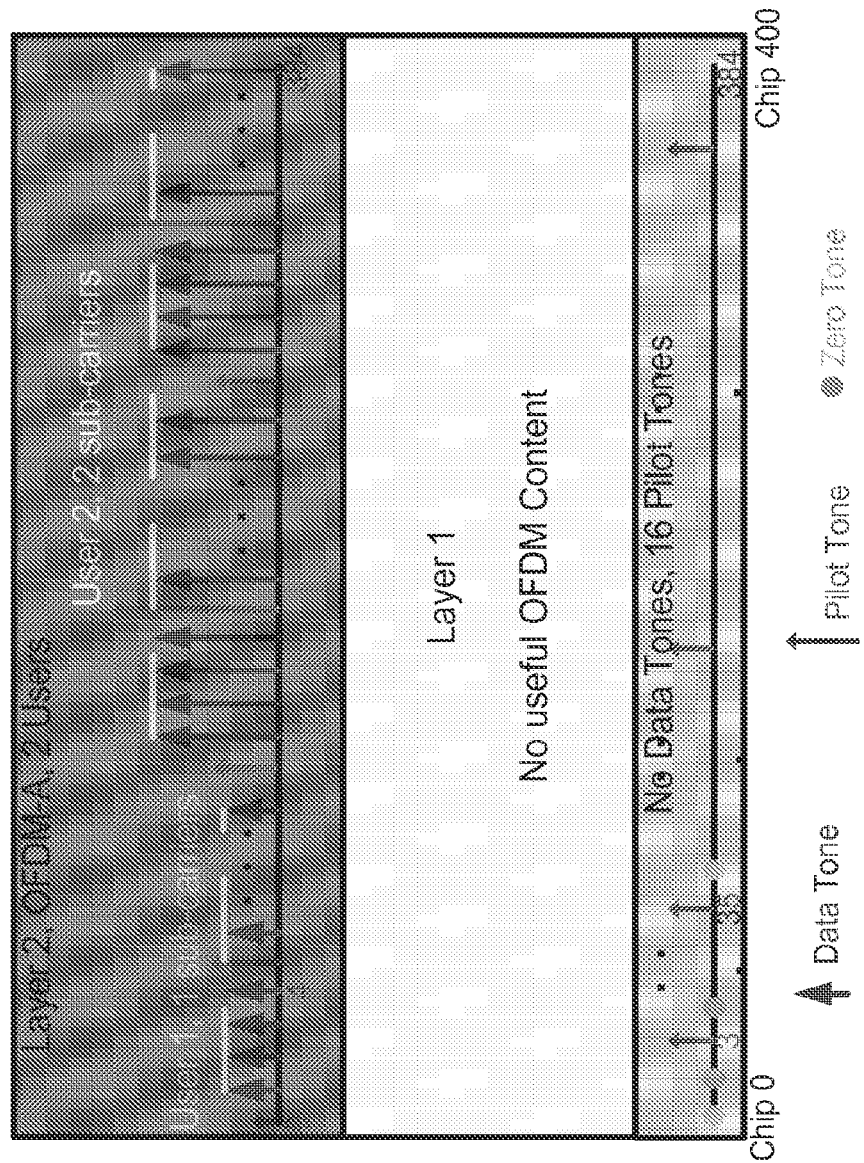

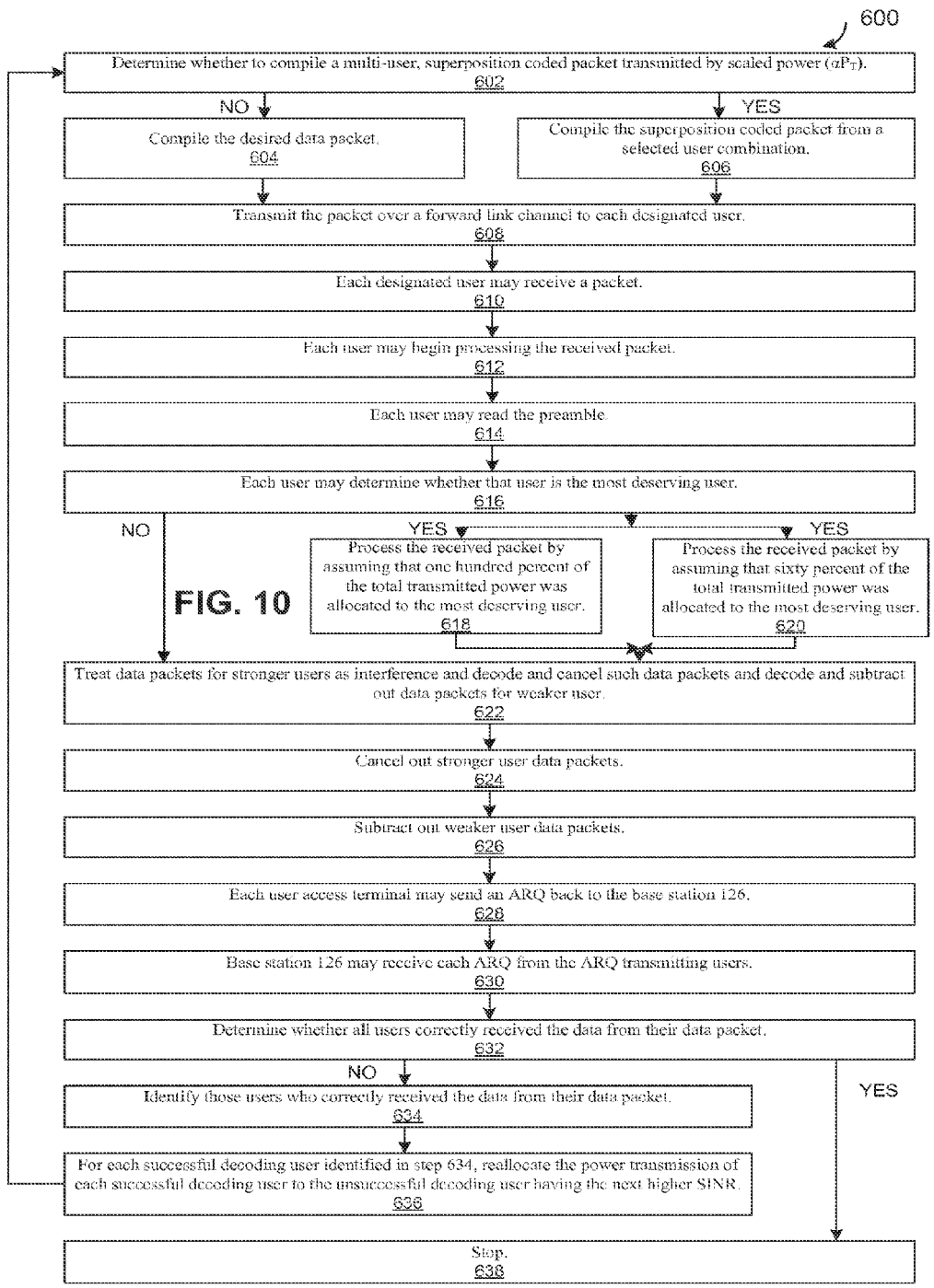

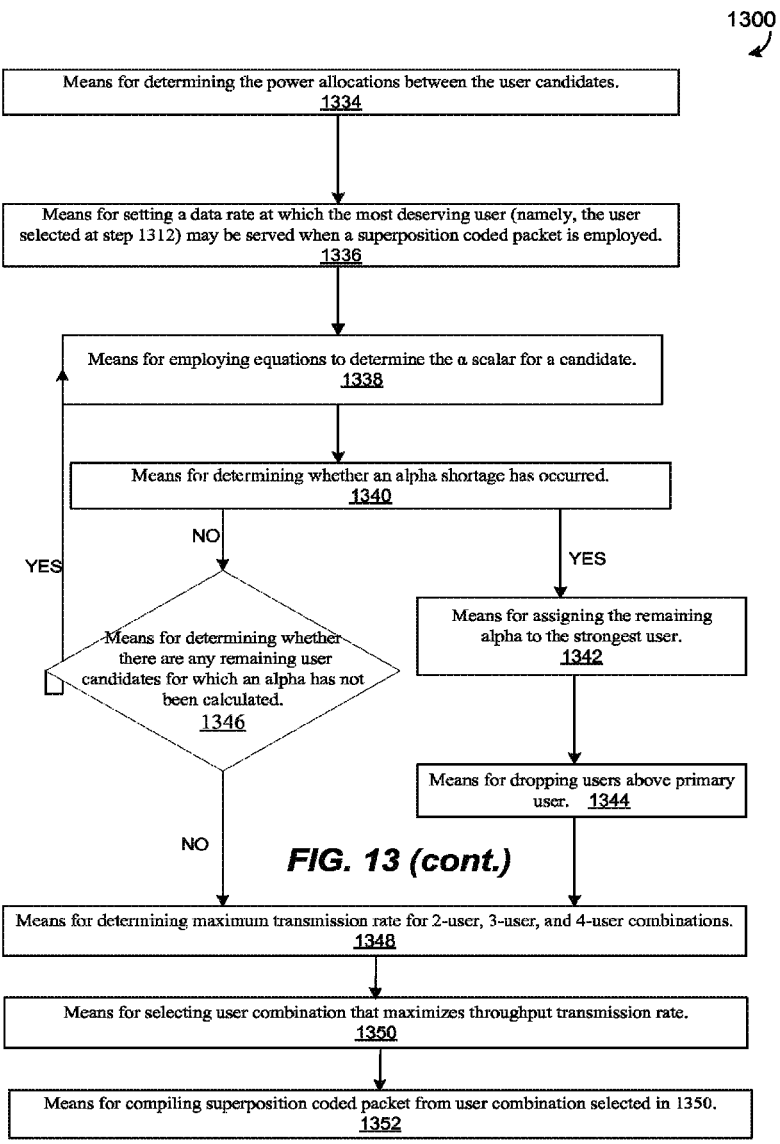

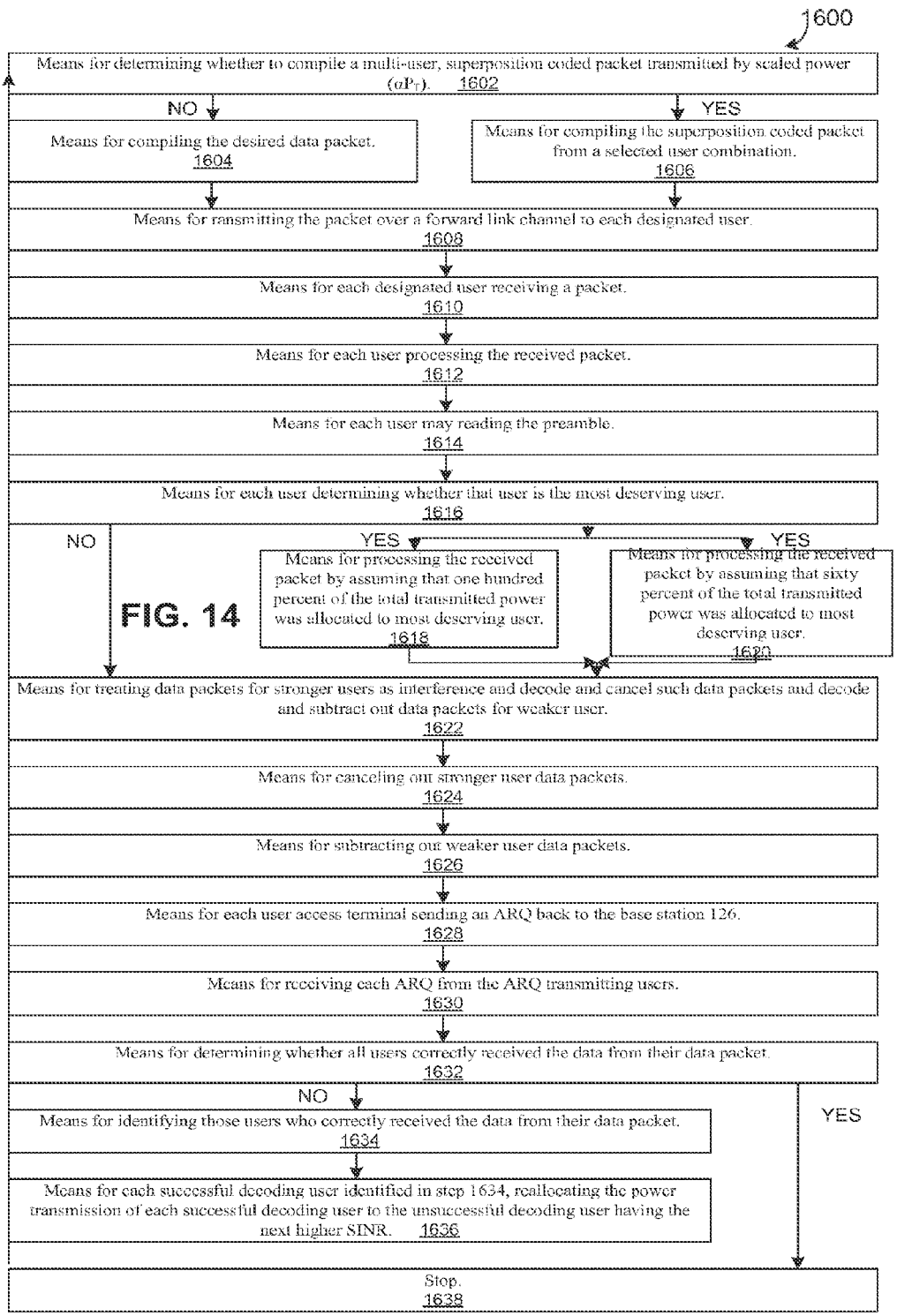

SUPERPOSITION CODING IN A WIRELESS COMMUNICATION SYSTEM

CLAIM OF PRIORITY UNDER 35 U.S.C. §119 and 35 U.S.C. §120

The present Application for Patent is a Divisional and claims priority to patent application Ser. No. 11/567,609, now issued as U.S. Pat. No. 8,085,819, filed Dec. 6, 2006, which claims priority to Provisional Application No. 60/794,874 filed Apr. 24, 2006, and assigned to the assignee hereof and hereby expressly incorporated by reference herein.

BACKGROUND

1. Field of the Invention

The present invention relates generally to methods and apparatus to schedule and wirelessly transmit information packets and more specifically to employ superposition coding to improve the forward link (FL) data throughput performance in a wireless communication system.

2. Background

There are a variety of wireless communication standards that may control the communication in a cellular communication system. The cdma2000 1xEV-DO standard ("cdma2000 High Rate Packet Data Air Interface Specification," TIA/EIA/IS-856) is a system for packet data communication developed by Qualcomm Inc., U.S.A. in the late 1990's to provide general data communication services in a wireless mobile environment. The 1xEV-DO system adopts intrinsic resource assignment methods corresponding to the characteristics of forward and reverse links.

Under the 1xEV-DO standard, the base station may transmit one data packet to one cell phone during that moment in time. In operation, a base station may continuously transmit pilot signals with a constant power. On receiving a pilot signal, a cell phone determines the intensity of the received pilot signal and sends the results back to the base station in the form of a requested Data Rate Control (DRC).

Fading is the probabilistic variation in the received intensity of a radio transmission. The phone's distance from the base station may affect the received pilot signal intensity. Also, dynamic events, such a truck passing between the cell phone and base station, the pilot signal reflecting off buildings to combine with or cancel the main pilot signal, may affect the received pilot signal intensity. In short, distance and interference conditions create disparity in this Forward Link Signal-to-Interference-and-Noise Ratio (FL SINR) and thus affect the requested DRC of each phone.

At the base station, a scheduler method may rank each cell phone by its pilot signal intensity (namely, requested DRC) and utilize that ranking to determine which one cell phone may receive the next data packet. In a typical intrinsic resource assignment method, the base station may send out that data packet which corresponds to the cell phone having the "most" deserving signal-to-interference-to-noise ratio (SINR). Which cell phone is most deserving may be decided by a scheduling method which may rank each cell phone based on a result of an evaluation function. During that moment in time, the most deserving user's needs may be addressed while the needs of the remaining users (in the above example, the needs of twenty-nine users) may have to wait.

Conventional intrinsic resource assignment methods attempt to provide fair service to all cell phones. This leads to a problem in that the weakest set of users limit the overall system data throughput performance. Moreover, users with lower FL SINRs are penalized with a lower than potential throughput and higher delays for their particular cell phone. There is therefore a need in the art for a system that improves the forward link data throughput performance and diminishes the delays for users with FL SINRs that are lower than the FL SINR of the stronger set of users while meeting the needs of the most deserving (possibly weaker set of) users.

SUMMARY

Embodiments disclosed herein address the above stated needs by using superposition coding for multiple candidates, one of which is the "most" deserving user, by selecting a 2-user, 3-user, or N-user combination that maximizes the forward link data throughput performance of the wireless communication system, and by dynamically reallocating the power transmission at the start of each time slot interlace.

A system to communicate a superposition coded packet from a base station to a plurality of remote stations is disclosed. At the base station, a list of user candidates for superposition coding may be compiled and the most deserving user among the user candidates may be determined. One embodiment limits superposition coding to no more than four user candidates, however, other embodiments may code with a different number of users. Those user candidates who have a requested data rate that may be less than a requested data rate of the most deserving user may be eliminated. A superposition coded packet may be compiled from the remaining user candidates. The various users in the superposition coded packet may use different modulation techniques and/or packet formats. For example, the lowest layer may use packet formats of a 1xEV-DO Revision A system.

The other users might use packet formats that utilize Orthogonal Frequency Domain Modulation (OFDM). Others may also use OFDMA (with different power allocation across the sub-carriers).

If a remote mobile receiving the superposition coded packet is the lowest layer, then that remote station may process the superposition coded packet by assuming alternatively that some apriori known fraction of power allocated to the lowest layer as well as all power allocated to the lowest layer. Further, if one or more users are successful in decoding before the nominal length of the data packet, their power may be re-allocated to another user.

The embodiments may be applied to a variety of applications. For example, when applied to a Voice-over-Internet Protocol (VoIP), the inventive superposition coding may allow for lower latencies (reduced transmission delays), a greater number of users per sector (namely, a higher capacity), or a combination of the two. When applied to broadcast services such as advertising, the broadcast services may be superposition coded with unicast traffic directed to an individual user so that both broadcast and unicast traffic may be transmitted together. This broadcast service may be the common information intended for all users (like the control channel in 1xEV-DO) or information intended for a particular region (like the information transmitted using platinum broadcast, also known as "cdma2000® High Rate Broadcast-Multicast Packet Data Air Interface Specification," TIA-1006-A). Thus, unlike conventional wireless communication systems, the present invention minimizes or eliminates the need to preempt broadcast traffic with unicast traffic. In other words, broadcast traffic need not be compromised during periods of unicast traffic for those systems employing the present method and apparatus.

BRIEF DESCRIPTION OF THE DRAWINGS

FIG. 8A is a table listing each user, an example DRC for each user, and an example resulting evaluation function F(n) for each user;

FIG. 8B is a table listing of the contents of FIG. 6A as sorted by the DRC for each user;

FIG. 8C is a table listing of the contents of FIG. 6A as sorted by the resulting evaluation function F(n) for each user;

FIG. 9F illustrates a 1xEV-DO forward link slot format used in the current embodiment, with layer 2 using OFDMA type packet format;

FIG. 10 is a flowchart containing the steps of method 600 which compiles, transmits, and processes one or more data packets;

FIG. 14 is a block diagram comprising means plus function blocks used to compile, transmit, and process one or more data packets.

DETAILED DESCRIPTION

Figure 1:
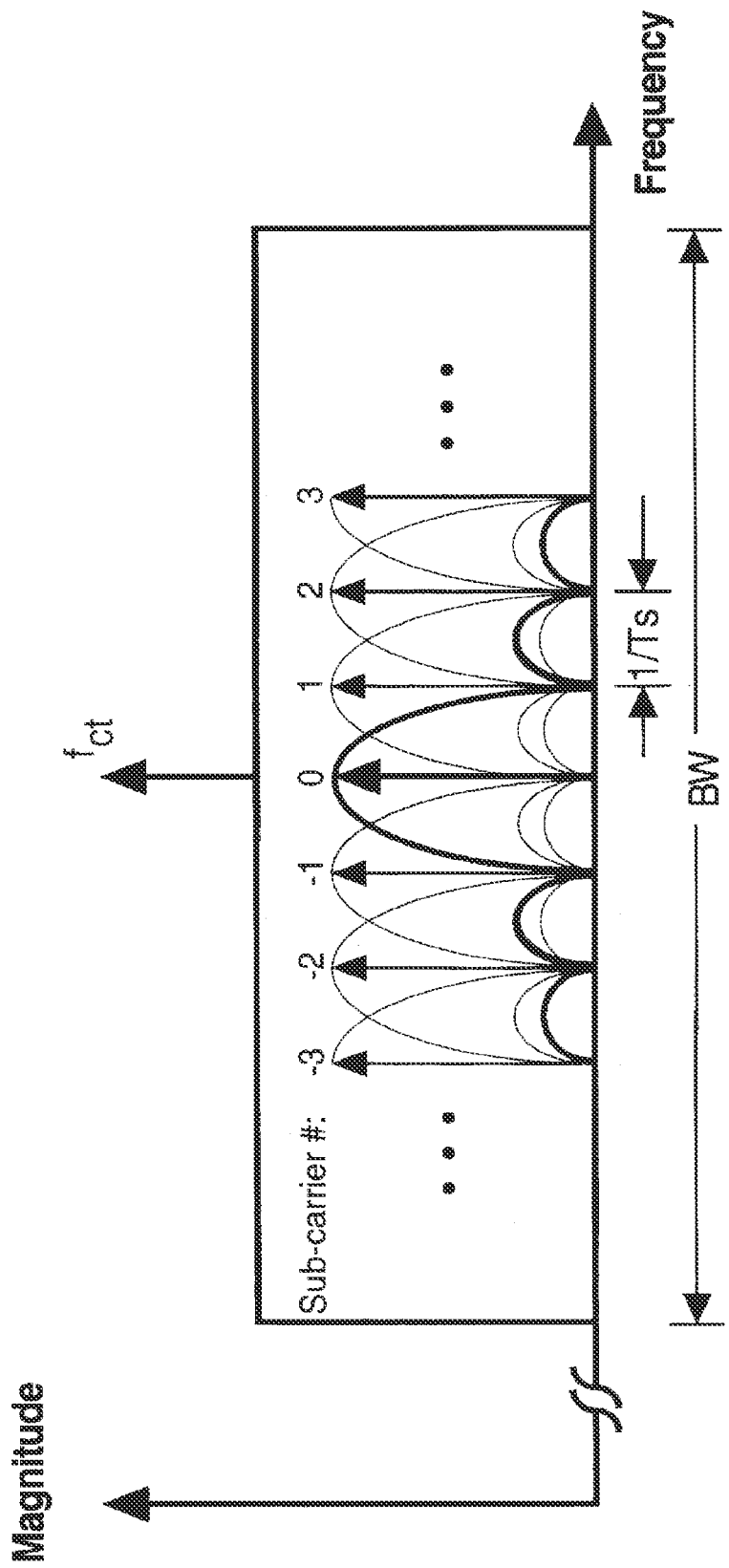
FIG. 1 is an illustration of a typical OFDM signal within an OFDM channel bandwidth showing the frequency domain positioning of OFDM sub-carriers according to the art.

Millions of people in the United States and around the world utilize cellular phones. One of the most interesting things about a cell phone is that it is actually a sophisticated radio. To provide communication, these sophisticated radios may be incorporated into a radiotelephone system such as a cellular system.

In a cellular system, a geographic area such as a city may be divided into a number of cells. Each cell may have a base station that includes a tower and a small building containing radio equipment. The base station within a cell may service the communication link needs of the cell phones located within that cell.

The communication link needs of a cell phone may be broken into two areas: reverse link (cell phone to base station link) and forward link (base station to cell phone link). During forward link operations, a base station may transmit data packets to the cell phones located within that cell. For example, at any one moment in time (e.g., during 1.67 milliseconds), the base station may have thirty different cell phone users requesting data.

There are a variety of wireless communication standards that may control the communication in a cellular communication system. The cdma2000 1xEV-DO standard ("cdma2000 High Rate Packet Data Air Interface Specification," TIA/EIA/IS-856) is a system for packet data communication developed by Qualcomm Inc., U.S.A. in the late 1990's to provide general data communication services in a wireless mobile environment. The 1xEV-DO system adopts intrinsic resource assignment methods corresponding to the characteristics of forward and reverse links.

The wireless communication standard may have different modulation techniques (for example, Code Division Multiple Access (CDMA), Orthogonal Frequency Division Multiplexing (OFDM), Orthogonal Frequency Division Multiple Access (OFDMA), etc.) in order to improve spectral efficiency. In one or more embodiments, the features of the present patent application may be used with these various forms of modulations. For example, although not limited to, it may be used with the OFDM disclosed in CDMA2000 1xEV-DO Rev C.

OFDM is a multi-carrier transmission technique, which divides the available spectrum into many equally spaced carriers or tones and carries a portion of a user's information on each tone. OFDM can be viewed as a form of frequency division multiplexing (FDM), however, OFDM has an important special property that each tone is orthogonal with every other tone. High-speed data signals are divided into tens or hundreds of lower speed signals. An OFDM system takes a data stream and splits it into N parallel data streams, each at a rate 1/N of the original rate. These lower speed signals are transmitted in parallel over respective frequencies within a radio frequency (RF) signal that are known as sub-carrier frequencies ("sub-carriers") or tones. A sub-carrier or tone is modulated by one of the low rate data streams, thereby producing a data tone. In addition, a sub-carrier may be modulated by a pilot signal, thereby producing a pilot tone. Thus, the ODFM signal is a sum of many signals with different subcarrier frequencies.

In addition, all of the carriers are orthogonal to one another. Because the carriers are orthogonal, each carrier has an integer number of cycles over a symbol period. Due to this, the spectrum of each carrier has a null at the center frequency of each of the other carriers in the system. See FIG. 1. Thus, the peak of each tone corresponds to a zero level, or null, of every tone. As a result, there is minimal interference between the carriers, allowing then to be spaced as close as theoretically possible. When the receiver samples at the center frequency of each tone, the only energy present is that of the desired signal, plus whatever other noise happens to be in the channel.

Figure 2:
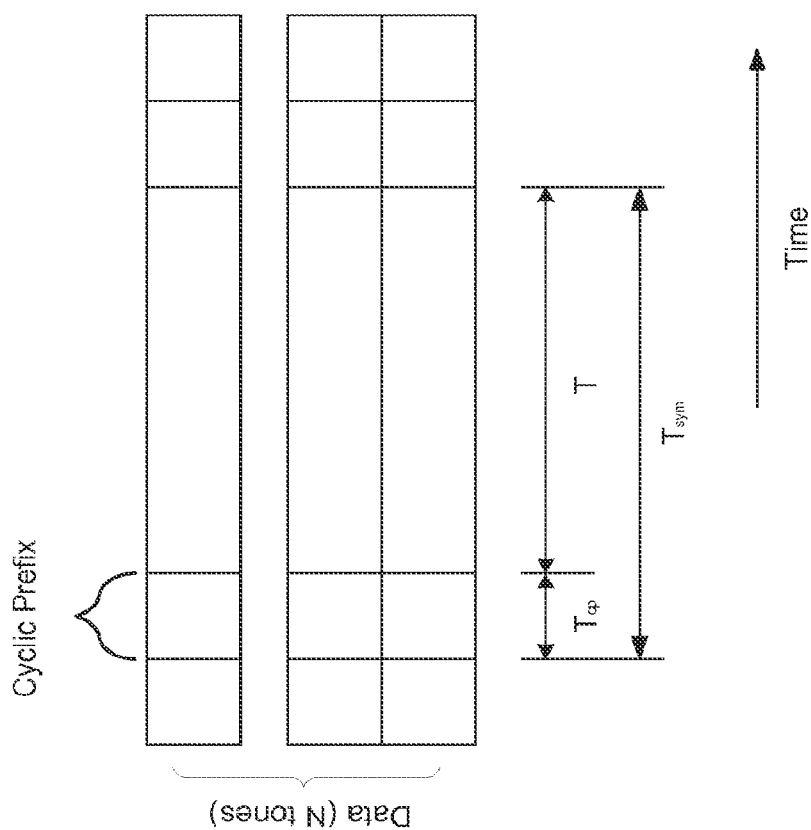
FIG. 2 shows three tones over a single symbol period, where each tone has an integer number of cycles during the symbol.

FIG. 2 shows three data tones over a single symbol period, where each tone has an integer number of cycles during the symbol.

The OFDM signal will retain its sub-carrier orthogonality property when transmitted through a non-dispersive channel. However, most channels are dispersive. Thus, significant time and/or frequency dispersion are introduced into the transmitted signal. These impairments introduce inter-carrier interference (ICI) and inter-symbol interference (ISI) and which can destroy the orthogonality of the sub-carriers.

To protect against time dispersions including multi-path, a guard interval equal to the length of the channel impulse response is introduced between successive OFDM symbols. The cyclic extended OFDM symbol thus consists of a guard interval and a useful part in which information is transmitted. The guard interval is commonly implemented by cyclic extension of the inverse fast Fourier transform (IFFT) output (i.e., cyclic retransmission of part of the periodic transform). To maintain transmission efficiency, system designers typically endeavor to limit the guard interval to less than one quarter of the useful OFDM symbol duration.

OFDM can also be considered a multiple access technique since individual tones or groups of tones can be assigned to different users. Each user may be assigned a predetermined number of tones when they have information to send, or alternatively, a user may be assigned a variable number of tones based on the amount of information they have to send. The assignments are controlled by the media access control layer (MAC) layer, which schedules the resource assignments based on user demand. In OFDMA, there is an added feature that the power assigned to different tones (users) can also be different (as shown in FIG. 9F), while satisfying the average power constraints over the entire bandwidth.

The global system for mobile communications (GSM) is a digital cellular communications standard which was initially developed in Europe and has gained rapid acceptance and market share worldwide. It was originally designed to be compatible with the integrated services digital network (ISDN) standard. Thus, the services provided by GSM are a subset of the standard ISDN services, speech being the most basic. A broader range of criteria in the development of GSM include spectrum efficiency, international roaming, low cost mobile and base stations, voice quality and the ability to support new services. Over time, the GSM standard has broadened and evolved to include a variety of channel and coding formats.

Figure 3:
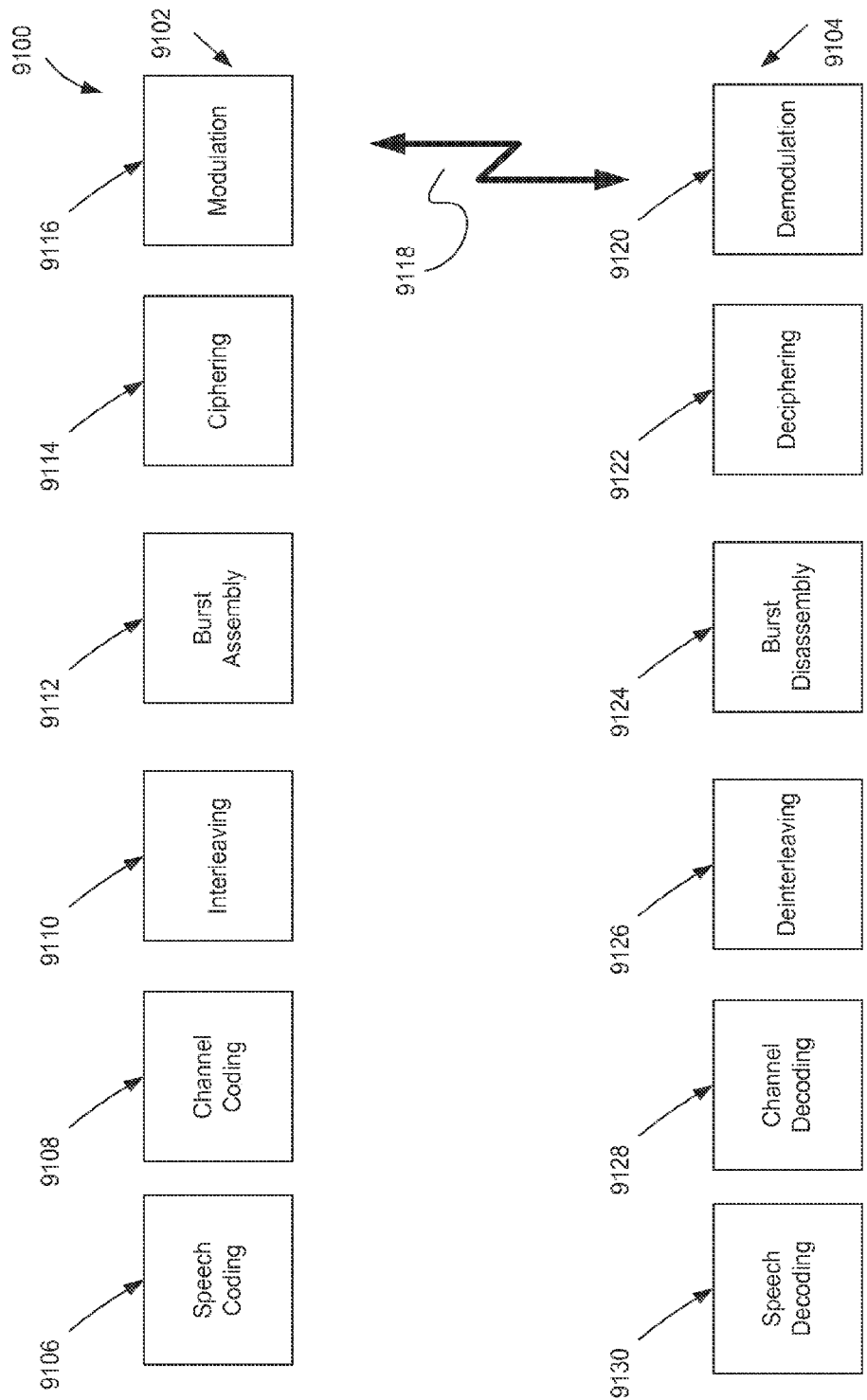
FIG. 3 is a block diagram of the basic operations of a GSM cellular system.

FIG. 3 is a block diagram of the basic operations of a GSM cellular system 9100. The system 9100 can be viewed as a series of processes which are performed on an audio source (e.g., speech) to take it from a source and reasonably reproduce it at a receiver. The source processes 9102, represented by the top row of operations, can be performed by a mobile station (e.g., a cell phone). The receiving processes 9104, represented by the bottom row of operations, can be performed at the base station. In general, the receiving processes 9104 are the reverse of the source processes 9102, performed in reverse order.

The GSM standard generally uses two frequency bands, each having a bandwidth of 25 MHz. The GSM-900 system operates at frequencies in two bands around 900 MHz (megahertz). One band, comprising the 890-915 MHz range, is allocated for uplink transmissions, transmitting from the mobile station to the base station. Another band, comprising the 935-960 MHz range, is allocated for downlink transmissions, transmitting from the base station to the mobile station. The GSM-1800 system (also called DCS) operates in two bands around 1800 MHz. The GSM-1900 system (also called PCS) operates in two bands around 1900 MHz.

Depending upon frequency allocation within particularly countries, regional variations of the actually frequency bands can occur.

The GSM standard employs a multiple access scheme that defines how simultaneous communication can occur between different mobile stations and base stations. A geographic cell structure of base stations provides a spatial diversity for the defined frequency spectrum. Within each cell, a combination of frequency division multiple access (FDMA) and time division multiple access (TDMA) techniques are employed by the standard. Each 25 MHz band is divided into 124 carrier frequencies spaced at 200 kHz intervals applying FDMA. Each of the carrier frequencies is then time wise divided into eight bursts, each lasting approximately 0.577 ms applying TDMA. The eight bursts for each carrier are viewed as a single "frame", lasting approximately 4.615 ms; a single user will employ one of the bursts within the frame. In this manner individual "channels" are formed which each correspond to a particular carrier frequency and burst number. Referring back to FIG. 3, the communication process for a particular mobile to base station communication link according to the GSM standard can now be described.

Speech coding 9106 at the first mobile base station converts incoming analog speech to a digital signal. Channel coding 9108 adds extra bits to the original information in order to aid in detecting and possibly correcting any errors occurring during the signal transmission.

The interleaving 9110 operation rearranges a group of bits in a particular way. The effect of interleaving is to reduce the likelihood of errors in the data stream. In general, because errors are more likely to affect consecutive bits within a burst, interleaving disperses the bits across bursts.

Figure 4:
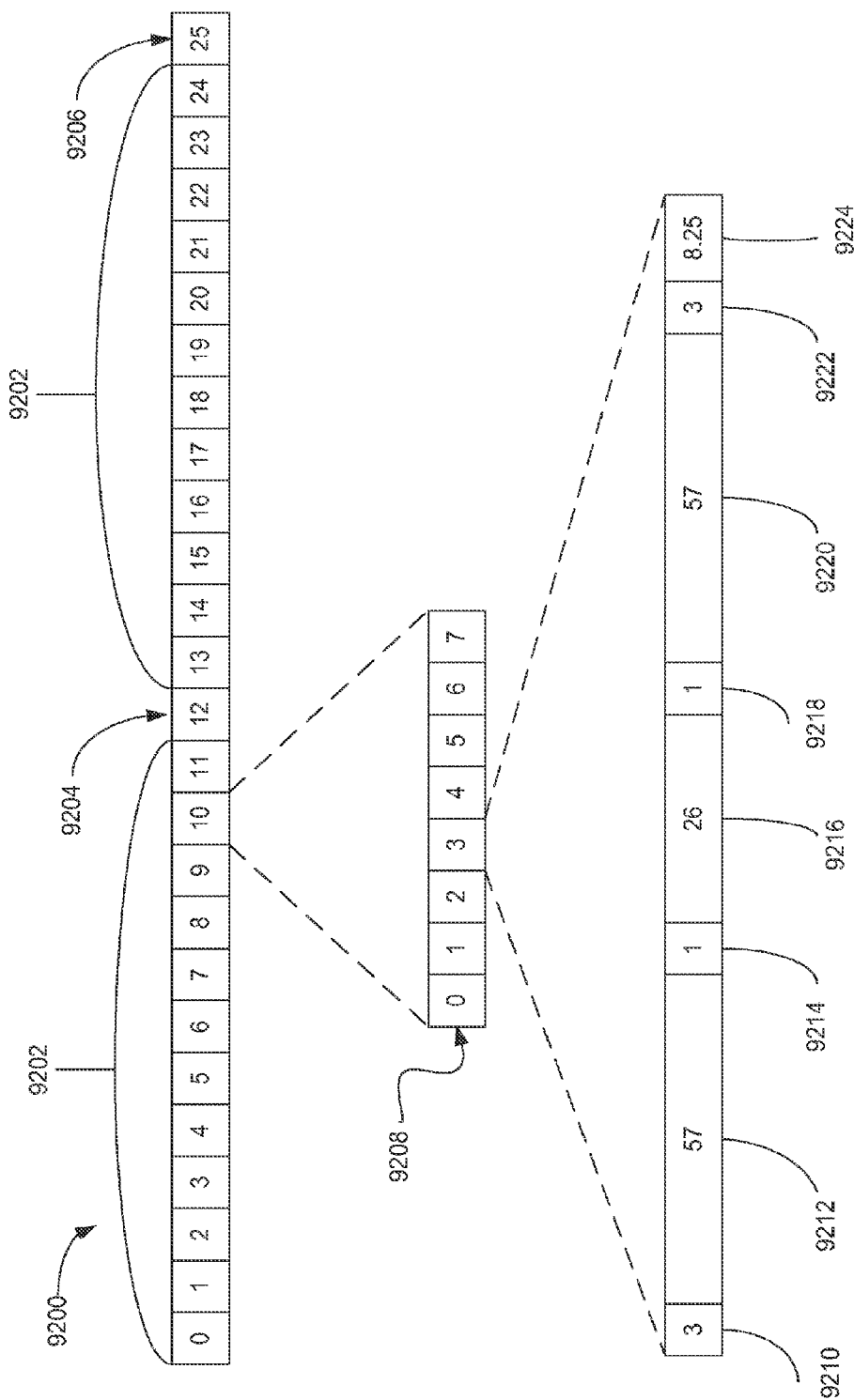
FIG. 4 illustrates a GSM burst structure.

Following interleaving 9110, the burst assembling 9112 procedure groups the bits into bursts for transmission. FIG. 4 illustrates a normal burst structure 9200. The normal burst structure 9200 comprises a multi-frame including 26 individual frames (numbered 0 through 25). Traffic channels 9202 occupy frames 0 through 11 and 13 through 24. Frame 12 is used for the slow associated control channel (SACCH) 9204. Frame 25 is unused in the case of a single full rate traffic channel, but employed as a second SACCH 9206 in the case of two half rate traffic channels. Furthermore, in the case of two half rate channels, the even numbered frames (except frame 12) are used as traffic for a first user and the odd numbered frames (except frame 25) are used as traffic for a second user. Each frame of the traffic channels 9202 comprises 8 bursts 9208 (numbered 0 through 7) and each burst 9208 has a structure as follows. The tail bits groups 9210, 9222 each comprise three bits set to zero and disposed at the beginning and the end of a burst 9208. They are used to cover the periods of ramping up and down of the mobile's power. Coded data groups 9212, 9220 each comprise 57 bits, containing signaling or user data. Stealing flags 9214, 9218 are used to indicate to the receiver whether the information carried by a burst 9208 corresponds to traffic or signaling data. The training sequence 9216 has a length of 26 bits. It is used to synchronize the receiver with the incoming information, avoiding then the negative effects produced by a multipath propagation. The guard period 9224, with a length of 8.25 bits, is used to avoid a possible overlap of two mobiles during the ramping time.

Referring back to FIG. 3, ciphering 9114 is used to protect signaling and user data. After ciphering 9114, the transmitted signal 9118 is formed by modulation 9116. Typically, the GSM standard employs a Gaussian Minimum Shift Keying (GMSK) modulation. The GMSK modulation has been selected as a compromise between spectrum efficiency, complexity and low spurious radiation (reducing the possibilities of adjacent channel interference). The GMSK modulation has a rate of 270 kbauds and a BT product equal to 0.3. Alternately, the GSM standard can also utilize an 8 phase shift keying (8-PSK) modulation for enhanced data for GSM evolution (EDGE) applications.

The modulated signal 9118 is then transmitted to a receiver, e.g. a base station, where the receiving operations 9104 are performed. The receiving processes include (in order) demodulating 9120, deciphering 9122, burst disassembly 9124, deinterleaving 9126, channel decoding 9128 and speech decoding 9130. These operations are the inverse of their respective transmission operations discussed above.

Figure 5:
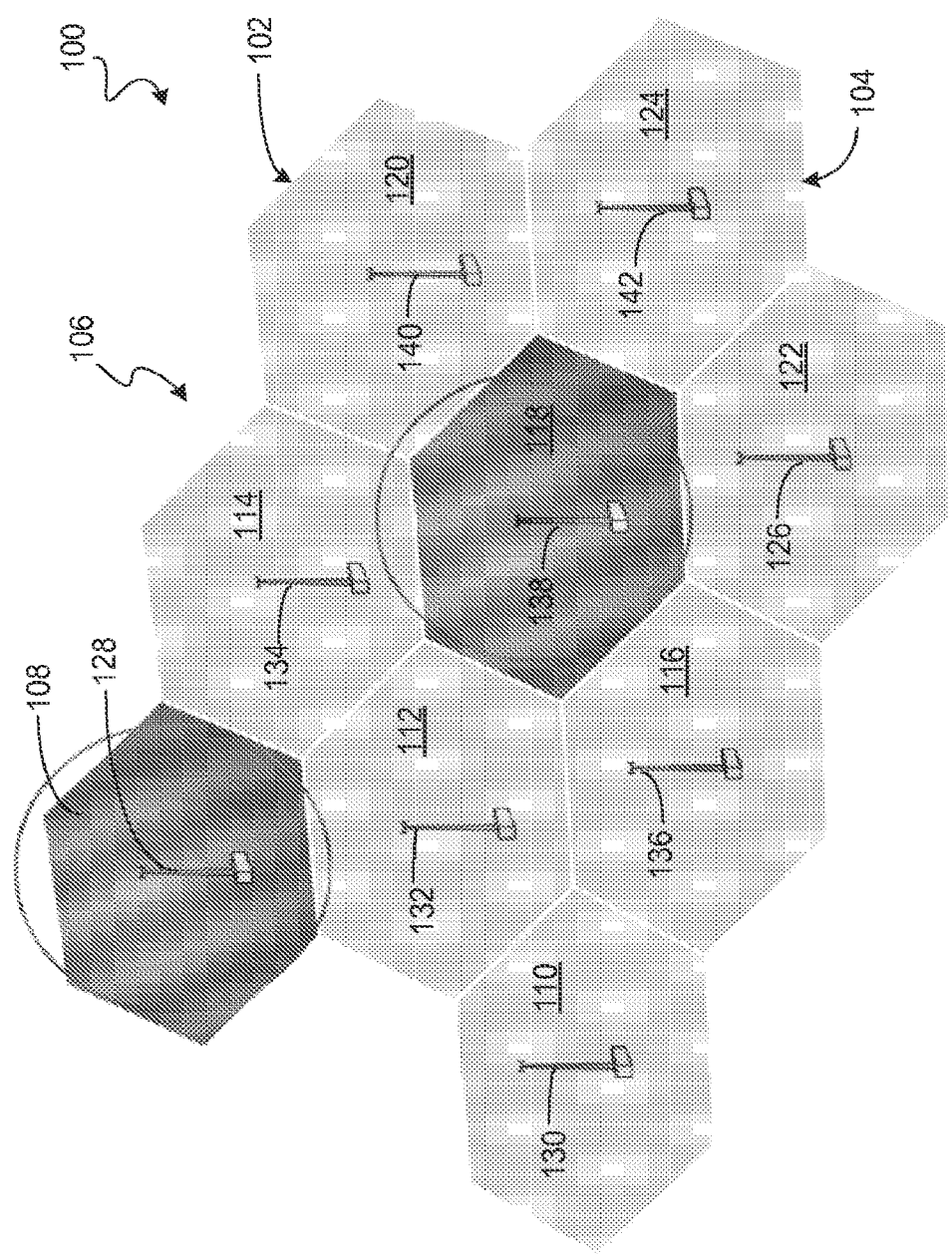
FIG. 5 is a perspective view of a wireless communication system.

FIG. 5 is a perspective view of a wireless communication system 100. Wireless communication system 100 may be a collection of individual communications networks, transmission systems, relay stations, tributary stations, and/or data terminal equipment capable of interconnection and interoperation to form an integrated whole. Wireless communication system 100 may include a geographic area 102 divided into a grid 104 containing a number of cells 106, here cells 108, 110, 112, 114, 116, 118, 120, 122, and 124. For example, a city or county may be divided into smaller cells. Cells 106 may vary in size depending upon terrain, capacity demands, and other factors. For example, in one embodiment each cell 106 has a hexagonal shape and is sized to about 10 square miles (26 square kilometers).

Wireless communication system 100 further may include a number of base stations 126, for example base stations 128, 130, 132, 134, 136, 138, 140, 142, and 144. Each cell 106 may have a base station 126. Base station 126 may be a radio transceiver (transmitter/receiver) that uses processing hardware/software, transmission power, and an antenna array to control and relay voice and data signals between two devices. Base station 126 may be a High Data Rate (HDR) base station apparatus and may be referred to as a Modem Pool Transceiver (MPT). By controlling the transmission power from each base station 126, radio frequencies assigned to each cell 106 may be limited to the boundaries of that particular cell 106. In this way, the same frequencies may be assigned to cell 108 and cell 118, for example.

Figure 6:
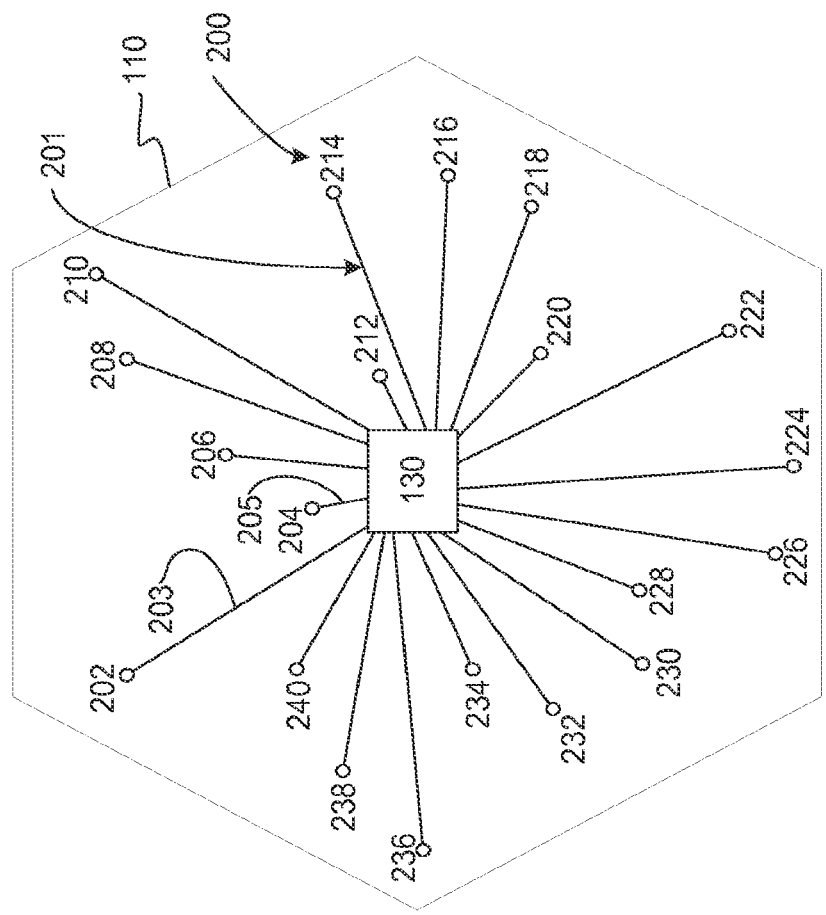
FIG. 6 is a detailed plan view of a cell of FIG. 5.

FIG. 6 is a detailed plan view of cell 110 of FIG. 5. Included within cell 110 may be Access Terminals (ATs), such as ATs 202, 204, 206 . . . 240. An AT 202-240 may be any data device that communicates through a wireless channel 201, 203, 205 or through a wired channel, for example using fiber optic or coaxial cables. Moreover, an AT 202-240 may further be any of a number of types of devices including but not limited to PC card, compact flash, external modem, internal modem, wireless phone, or wireline phone.

Each AT 202-240 may be referred to as a user and may include a cell phone, a mobile station, a base mobile transceiver, a satellite, a mobile radiotelephone set, a base mobile transceiver, a remote station apparatus, or a High Data Rate (HDR) subscriber station. Moreover, each AT 202-240 may be mobile or stationary and may be adapted to communicate data packets with one or more base stations 126-142 (FIG. 5) through reverse links 201. AT 202 may transmit and receive data packets through one or more base stations 126-142 to an HDR base station controller, which may be referred to as a Modem Pool Controller (MPC).

Modem pool transceivers and modem pool controllers may be parts of a network called an Access Network (AN). An AT 202-240 may be that portion of a public or private switched network that connects access nodes to individual subscribers. For example, an AN may transport data packets between multiple ATs 202-240. The AN may further connect to additional networks outside the AN, such as a corporate intranet or the Internet, and may transport data packets between each AT 202-240 and such outside networks. Collectively or in portions thereof, these may be parts of wireless communication system 100.

An AT 202-240 having established an active traffic channel connection with one or more base stations 126 may be referred to as an active AT 202-240. An active AT 202-240 is said to be in a traffic state. An AT 202-240 that is in the process of establishing an active traffic channel connection with one or more base stations 126-144 is said to be in a connection setup state.

Reverse links 201 (FIG. 6) may be radio interfaces that connects the AT 202-240, such as AT 214, to AN services provided by base station 130. For example, AT 202 may be adapted to communicate data packets with base station 130 through a reverse link 203 and AT 204 may be adapted to communicate data packets with base station 130 through a reverse link 205 (see FIG. 5).

A data packet may be viewed as a block of data arranged in the form of a packet having a preamble and a payload. The preamble may carry overhead information about the content of the packet and destination address; and the payload may then be the user information. Typically, a base station 126-142 transmits a data packet to one user 202-240 at a time (single user packet) or to multiple users at a time (multi-user data packet). The data portion in the payload can be formed utilizing different modulation techniques, to improve spectral efficiency. In the example flowchart shown in FIG. 7, the most deserving user 202 utilizes the packet format prescribed by the 1xEV-DO Rev B system, while the other users 204, 218, 232 use the OFDM packet formats. The proposed method of superposition coding applies to a system where each layer may have a payload constructed using different multiple access techniques.

Superposition coding is a technique where two or more data packets may be combined at the base station 126-142 as a superposition coded packet and transmitted with scaled power to multiple users at a moment in time. As in T. M. Cover, *Broadcast Channels*, IEEE Transactions on Information Theory, IT-18 (1): Feb. 14, 1972, signals to different users are superposed on each other and transmitted with different powers in the same data packet. An aspect of the present method and apparatus employs superposition coding to improve the data throughput capacity from a base station 126-142, such as base station 130 (FIG. 6), to ATs 202-240 in a wireless communication system 100. The superposition coded packets shared a common resource, namely "power;" while the multi-user packets share a common resource, namely "time."

The combining of two data packets may be achieved with superposition by (1) scaling the first set of symbol substreams with a first scaling factor, (2) scaling the second set of symbol substreams with a second scaling factor, and (3) summing the first set of scaled symbol substreams with the second set of scaled symbol substreams to obtain the multiple transmit symbol streams. The first and second scaling factors determine the amount of transmit power to use for the base stream and enhancement stream, respectively.

Figure 7:
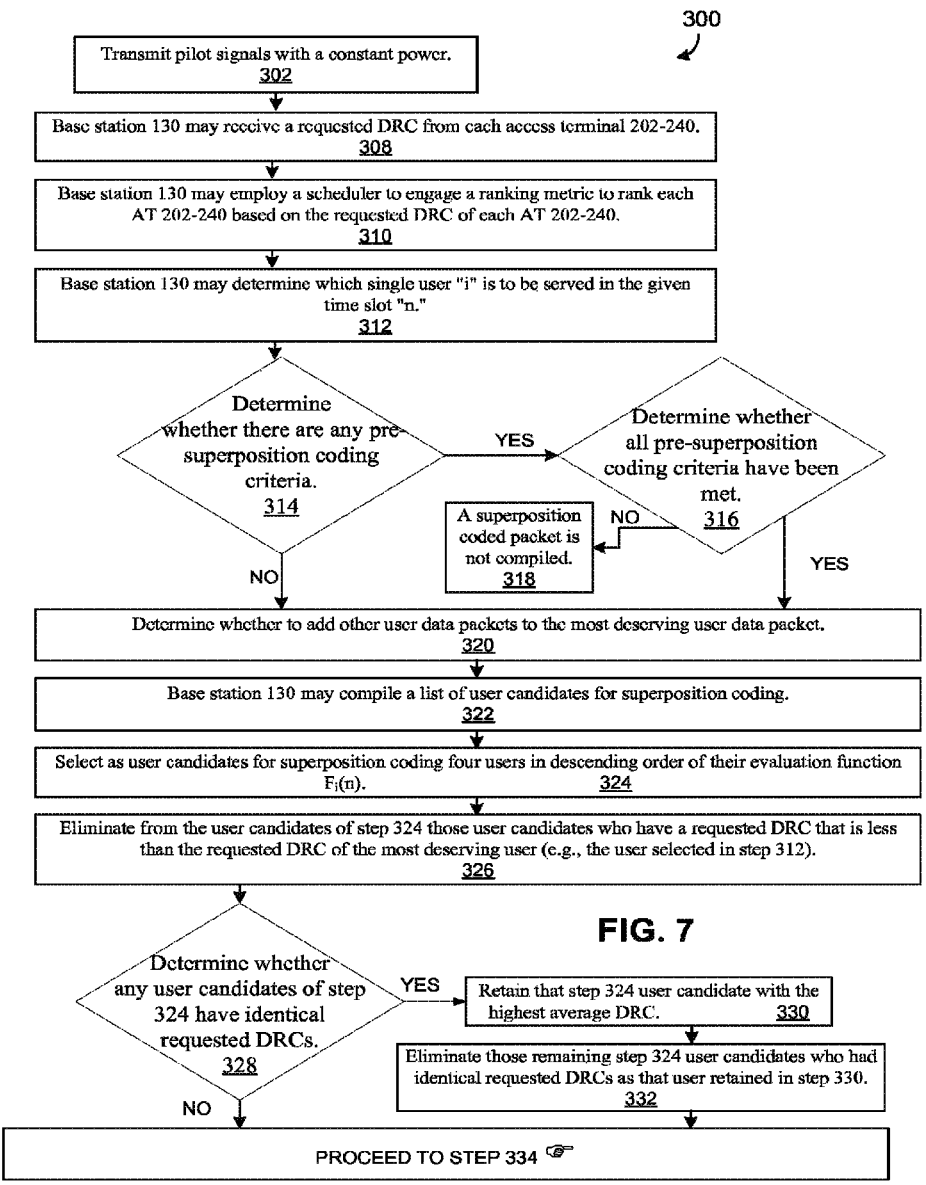
FIG. 7 is flowchart comprising the steps of method 300 used to compile fixed length information packets into a superposition coded packet having an address header.

FIG. 7 is a flowchart containing the steps of a method 300 used to compile fixed length information packets into a superposition coded packet having an address header. In radio communications, a forward link traffic channel 504 (e.g., forward link) is typically the link from a fixed location (e.g., a base station) to a mobile user 202. If the link 504 includes a communications relay satellite, the forward link 504 may consist of both an uplink (base station to satellite) and a downlink (satellite to mobile user).

The forward link channel 504a-d of method 300 may be of a single data channel that is divided into plural time slots. For reference only, the length of each time slot may be 1.67 milliseconds (msec). As noted above, a base station 126 typically transmits one data packet during a single time slot. For a forward link channel 504 with "i" number of users, method 300 considers the transmission of one or more data packets during a single time slot "n." As will be shown, by transmitting more than one data packet during a single time slot, the method 300 works to improve the data throughput rate on the forward link channel 504 towards the theoretical peak data throughput rate on the forward link channel 504. It should be noted that the packet formats of different users may conform to different wireless communication standards.

A pilot signal may be viewed as a signal transmitted over a communications system for supervisory, control, equalization, continuity, synchronization, or reference. In method 300, transmitted pilot signals may be used to support channel estimation for coherent detection. At step 302, base station 130 may continuously transmit pilot signals with a constant power. Each AT 202 may then receive a pilot signal.

During its travel from base station 130 to an AT 202-240, the intensity or strength of the pilot signal may vary due to the distance from the base station 130, interference from other base stations 126, 128, 132-142, shadowing, short-term fading, and multi-path. Thus, each AT 202-240 may predict an achievable Signal-to-Interference-and-Noise Ratio (SINR) from its received pilot signal. From the predicted SINR, each AT 202-240 may compute a DRC. The data rate control (sometimes referred to as requested data rate) may represent the information transmission rate that the AT 202-240 may support in the near future while maintaining a given Packet Error Rate (PER), such as a 1% PER. In other words, the requested DRC may be the best rate at which an AT 202-240 predicts that it may be reliably served by base station 130 for a given time slot.

At step 308, base station 130 may receive a requested DRC from each AT 202-240. Each received DRC may represent a request for immediate service by an AT 202-240. A present problem with typical wireless communications is that not all ATs 202-240 requesting immediate service may be served at the same time. Thus, base station 130 may select those ATs 202-240 whose needs may be served for a give time slot through resource allocation decisions.

Resource allocation decisions may be concerned with the allocation of limited resources to achieve the best system performances. In method 300 at step 310, base station 130 may employ a scheduler 714 to engage a ranking metric, such as a scheduler method, to rank each AT 202-240 based on a result of an evaluation function that utilizes the requested DRC of each AT 202-240. The ranking may be used to determine which data packet(s) may be transmitted during the single time slot "n," preferably to maximize individual data throughput and system data throughput while maintaining some notion of fairness.

Examples of scheduling algorithms include Round Robin (RR), Weighted Round Robin (WRR), Bandwidth On Demand (BOD), Equal Grade of Service (E-GoS), Proportionally Fair (PFair) and those utilizing delay parameters. Preferably, method 300 employs a scheduling algorithm that attempts to provide a fair (equal) treatment of all the competing ATs 202-240 while efficiently allocating resources. For example, method 300 may employ the Proportionally fair (P-fair) fairness metric or the Equal Grade of Service (E-GoS) fairness metric at step 310.

Under the P-fair metric, the scheduler 714 may take advantage of the short-term time variations of the forward link channel 504 by scheduling transmissions to ATs 202-240 during periods where the ATs 202-240 see strong signal levels. Here, the scheduler 714 may employ the method:

$$F_i(n) = \max_i \left( \frac{DRC_i(n)}{R_i(n)} \right) \quad (1)$$

where, $F_i(n)$ is the evaluation function for user "i" at time slot "n," where i=1, ..., N;

$DRC_i(n)$ is the instantaneous data rate requested by user "i" in the time slot "n";

$R_i(n)$ is the average data rate successfully received by user "i" over a time window of appropriate size; and $\max_i(\bullet)$ returns the maximum value for the determined parenthetical numeric values of user "i."

Using the P-fair metric of equation (1), each user "i" may be served in time slots in which its requested rate is closer to the peak compared to its recent requests. By way of comparison, a scheduler 714 employing an E-GoS metric additionally takes into account the average data rate at which user "i" has requested to be served over a time window of appropriate size. Here, each user "i" may be provided an approximately equal opportunity to receive a data packet without regard to channel condition so as not to penalize a user 202-240 for moving within the system. In other words, each user "i" may be given enough time for all ATs 202-240 to achieve the same average data rate over a time window of appropriate size. As an E-GoS metric, the scheduler 714 may employ:

$$F_i(n) = \max_i \left( \frac{DRC_i(n)}{R_i(n)} \times \frac{1}{\langle DRC_i(n) \rangle} \right) \quad (2)$$

where, $\langle DRC_i(n) \rangle$ represents the average data rate requested by user "i" in the given time slot "n" over a time window of appropriate size. As may be determined from equation (2), as the average data rate requested by user "i" decreases, the evaluation function $F_i(n)$ for user "i" increases, making it more likely that user "i" may be served in the given time slot "n".

At step 312, base station 130 may determine which single user "i" is to be served in the given time slot "n." This decision epoch may be achieved by selecting that user "i" with greatest value for the evaluation function $F_i(n)$. A user 202-240 having the greatest value for the evaluation function $F_i(n)$ may reflect that such a user 202-240 is the most deserving (e.g. weakest, but recovering) user 202-240. It may be helpful at this point to provide a numerical example.

FIG. 8A is a table listing each user 202 through 240, an example DRC for each user 202-240, and an example resulting evaluation function F(n) for each user 202-240. Each DRC may be measured in kilobits per second (kbps). FIG. 8B is a table listing of the contents of FIG. 8A as sorted by the DRC for each user 202-240. FIG. 8C is a table listing of the contents of FIG. 8A as sorted the resulting evaluation function F(n) for each user 202-240. If the results of FIG. 8C were used by base station 130, user 202 would have the greatest value for the evaluation function $F_i(n)$, namely $F_i(n)$=45. Thus, base station 130 may determine that user 202 is the most deserving user 202 and determine at step 312 that user 202 is to be served in the given time slot "n."

With the single user "i" is to be served in the given time slot "n" selected at step 312, there may be certain criteria that should be met before determining whether to bundle the data packet of the most deserving user 202 with other data packets into a superposition coded packet. Thus, method 300 may determine at 314 whether there are any pre-superposition coding criteria and, if there are, method 300 may determine at 316 whether all pre-superposition coding criteria have been met. Pre-superposition coding criteria may be a function of the particular standard employed by a wireless communication system. One wireless communication standard is the cdma2000 1xEV-DO standard ("cdma2000 High Rate Packet Data Air Interface Specification," TIA/EIA/IS-856).

The cdma2000 1xEV-DO standard is a system for packet data communication to provide general data communication services in a wireless mobile environment. The 1xEV-DO system adopts intrinsic resource assignment methods corresponding to the characteristics of forward 504 and reverse links 201.

The forward traffic channel is a packet-based, variable-rate channel. The user physical layer packets for an access terminal may be transmitted as shown in Table 1A at a data rate that varies from 4.8 kbps to 3.072 Mbps. Table 1A below lists the modulation parameters for the physical layer packets for the forward traffic channel and the control channel of the 1xEV-DO rev B forward link 504.

TABLE 1A

| Transmission Format (Physical Layer Packet Size(bits), Nominal Transmit Duration (slots), Preamble Length (chips)) | Code Rate | Modulation Type | Nominal Data Rate (kbps) |
|---|---|---|---|
| (128, 16, 1024) | 1/5 | QPSK | 4.8 |
| (128, 8, 512) | 1/5 | QPSK | 9.6 |
| 128, 4, 1024) | 1/5 | QPSK | 19.2 |
| (128, 4, 256) | 1/5 | QPSK | 19.2 |
| (128, 2, 128) | 1/5 | QPSK | 38.4 |
| (128, 1, 64) | 1/5 | QPSK | 76.8 |
| (256, 16, 1024) | 1/5 | QPSK | 9.6 |
| (256, 8, 512) | 1/5 | QPSK | 19.2 |
| (256, 4, 1024) | 1/5 | QPSK | 38.4 |
| (256, 4, 256) | 1/5 | QPSK | 38.4 |
| (256, 2, 128) | 1/5 | QPSK | 76.8 |
| (256, 1, 64) | 1/5 | QPSK | 153.6 |
| (512, 16, 1024) | 1/5 | QPSK | 19.2 |
| (512, 8, 512) | 1/5 | QPSK | 38.4 |
| (512, 4, 1024) | 1/5 | QPSK | 76.8 |
| (512, 4, 256) | 1/5 | QPSK | 76.8 |
| (512, 4, 128) | 1/5 | QPSK | 76.8 |
| (512, 2, 128) | 1/5 | QPSK | 153.6 |
| (512, 2, 64) | 1/5 | QPSK | 153.6 |
| (512, 1, 64) | 1/5 | QPSK | 307.2 |
| (1024, 16, 1024) | 1/5 | QPSK | 38.4 |
| (1024, 8, 512) | 1/5 | QPSK | 76.8 |
| (1024, 4, 256) | 1/5 | QPSK | 153.6 |
| (1024, 4, 128) | 1/5 | QPSK | 153.6 |
| (1024, 2, 128) | 1/5 | QPSK | 307.2 |
| (1024, 2, 64) | 1/5 | QPSK | 307.2 |
| (1024, 1, 64) | 1/5 | QPSK | 614.4 |
| (2048, 4, 128) | 1/3 | QPSK | 307.2 |
| (2048, 2, 64) | 1/3 | QPSK | 614.4 |
| (2048, 1, 64) | 1/3 | QPSK | 1,228.8 |
| (3072, 2, 64) | 1/3 | QPSK | 921.6 |
| (3072, 1, 64) | 1/3 | QPSK | 1,843.2 |
| (4096, 2, 64) | 1/3 | QPSK | 1,228.8 |
| ((4096, 1, 64) | 1/3 | QPSK | 2,457.6 |
| (5120, 2, 64) | 1/3 | QPSK | 1,536.0 |
| (5120, 1, 64) | 1/3 | QPSK | 3,072.0 |

Table 1B below lists the modulation parameters for the optional user physical layer packets on the forward traffic channel and the control channel of the 1xEV-DO rev B forward link 504. If transmitted, they may be transmitted at a data rate that varies from 153.6 kbps to 4.915 Mbps.

TABLE 1B

| Transmission Format (Physical Layer Packet Size(bits), Nominal Transmit Duration (slots), Preamble Length (chips)) | Code Rate | Modulation Type | Nominal Data Rate (kbps) |
|---|---|---|---|
| (1024, 4, 64) | 1/5 | QPSK | 153.6 |
| (2048, 4, 64) | 1/3 | QPSK | 307.2 |
| 3072, 4, 64) | 1/3 | QPSK | 460.8 |
| (4096, 4, 64) | 1/3 | QPSK | 614.4 |
| (5120, 4, 64) | 1/3 | 8-PSK | 768.0 |
| (6144, 4, 64) | 1/3 | 16-QAM | 921.6 |
| (6144, 2, 64) | 1/3 | 64-QAM | 1,843.2 |
| (6144, 1, 64) | 1/3 | 64-QAM | 3,686.4 |
| (7168, 4, 64) | 1/3 | 16-QAM | 1,075.2 |
| (7168, 2, 64) | 1/3 | 64-QAM | 2,150.4 |
| (7168, 1, 64) | 1/3 | 64-QAM | 4300.8 |
| (8192, 4, 64) | 1/3 | 16-QAM | 1,228.8 |
| (8192, 2, 64) | 1/3 | 16-QAM | 2,457.6 |
| (8192, 1, 64) | 1/3 | 64-QAM | 4,915.2 |

DRC indexes in 1xEV-DO Rev B have a set of associated transmission formats for single-user packet and multi-user packet. A detailed listing of DRC indices and their associated transmission formats is provided in Table 1C.

TABLE 1C

| Transmission Formats for 1xEV-DO RevB DRC Index | Rate kbps | Termination Target (slots) | Maximum Span (slots) | RevB Single User Transmission Formats | RevB Multi-User Transmission Formats |
|---|---|---|---|---|---|
| 0x00 | 0 | 16 | 16 | (128, 16, 1024), (256, 16, 1024), (512, 16, 1024), (1024, 16, 1024) | (128, 4, 256), (256, 4, 256), (512, 4, 256), (1024, 4, 256) |
| 0x01 | 38.4 | 16 | 16 | (128, 16, 1024), (256, 16, 1024), (512, 16, 1024), (1024, 16, 1024) | (128, 4, 256), (256, 4, 256), (512, 4, 256), (1024, 4, 256) |
| 0x02 | 76.8 | 8 | 8 | (128, 8, 512), (256, 8, 512), | (128, 4, 256), (256, 4, 256), |

TABLE 1C-continued

| Transmission Formats for 1xEV-DO RevB DRC Index | Rate kbps | Termination Target (slots) | Maximum Span (slots) | RevB Single User Transmission Formats | RevB Multi-User Transmission Formats |
|---|---|---|---|---|---|
| 0x03 | 153.6 | 4 | 8 | (512, 8, 512), (1024, 8, 512) (128, 4, 256), (256, 4, 256), (512, 4, 256), (1024, 4, 256) | (512, 4, 256), (1024, 4, 256) (128, 4, 256), (256, 4, 256), (512, 4, 256), (1024, 4, 256) |
| 0x04 | 307.2 | 2 | 4 | (128, 2, 128), (256, 2, 128), (512, 2, 128), (1024, 2, 128) | (128, 4, 256), (256, 4, 256), (512, 4, 256), (1024, 4, 256) |
| 0x05 | 307.2 | 4 | 8 | (512, 4, 128), (1024, 4, 128), (2048, 4, 128) | (128, 4, 256), (256, 4, 256), (512, 4, 256), (1024, 4, 256), (2048, 4, 128) |
| 0x06 | 614.4 | 1 | 4 | (128, 1, 64), (256, 1, 64), (512, 1, 64), (1024, 1, 64) | (128, 4, 256), (256, 4, 256), (512, 4, 256), (1024, 4, 256) |
| 0x07 | 614.4 | 2 | 4 | (512, 2, 64), (1024, 2, 64), (2048, 2, 64) | (128, 4, 256), (256, 4, 256), (512, 4, 256), (1024, 4, 256), (2048, 4, 128) |
| 0x08 | 921.6 | 2 | 4 | (1024, 2, 64), (3072, 2, 64) | (128, 4, 256), (256, 4, 256), (512, 4, 256), (1024, 4, 256), (2048, 4, 128), (3072, 2, 64) |
| 0x09 | 1228.8 | 1 | 4 | (512, 1, 64), (1024, 1, 64), (2048, 1, 64) | (128, 4, 256), (256, 4, 256), (512, 4, 256), (1024, 4, 256), (2048, 4, 128) |
| 0x0a | 1228.8 | 2 | 4 | (4096, 2, 64) | (128, 4, 256), (256, 4, 256), (512, 4, 256), (1024, 4, 256), (2048, 4, 128), (3072, 2, 64), (4096, 2, 64) |
| 0x0b | 1843.2 | 1 | 4 | (1024, 1, 64), (3072, 1, 64) | (128, 4, 256), (256, 4, 256), (512, 4, 256), (1024, 4, 256), (2048, 4, 128), (3072, 2, 64) |
| 0x0c | 2457.6 | 1 | 4 | (4096, 1, 64) | (128, 4, 256), (256, 4, 256), (512, 4, 256), (1024, 4, 256), (2048, 4, 128), (3072, 2, 64), (4096, 2, 64) |
| 0x0d | 1536.0 | 2 | 4 | (5120, 2, 64) | (128, 4, 256), (256, 4, 256), (512, 4, 256), (1024, 4, 256), (2048, 4, 128), (3072, 2, 64), (4096, 2, 64), (5120, 2, 64) |
| 0x0e | 3072 | 1 | 4 | (5120, 1, 64) | (128, 4, 256), (256, 4, 256), (512, 4, 256), (1024, 4, 256), (2048, 4, 128), (3072, 2, 64), (4096, 2, 64), (5120, 2, 64) |
| 0x0f | N/A | N/A | N/A | N/A | NA |
| 0x10 | 460.8 | 4 | 8 | (1024, 4, 64), (2048, 4, 64), (3072, 4, 64) | (128, 4, 256), (256, 4, 256), (512, 4, 256), |

TABLE 1C-continued

| Transmission Formats for 1xEV-DO RevB DRC Index | Rate kbps | Termination Target (slots) | Maximum Span (slots) | RevB Single User Transmission Formats | RevB Multi-User Transmission Formats |
|---|---|---|---|---|---|
| 0x11 | 614.4 | 4 | 8 | (1024, 4, 64), (2048, 4, 64), (4096, 4, 64) | (1024, 4, 256), (2048, 4, 128) (128, 4, 256), (256, 4, 256), (512, 4, 256), (1024, 4, 256), (2048, 4, 128) |
| 0x12 | 768.0 | 4 | 8 | (1024, 4, 64), (2048, 4, 64), (5120, 4, 64) | (128, 4, 256), (256, 4, 256), (512, 4, 256), (1024, 4, 256), (2048, 4, 128) |
| 0x13 | 921.6 | 4 | 8 | (2048, 4, 64), (6144, 4, 64) | (128, 4, 256), (256, 4, 256), (512, 4, 256), (1024, 4, 256), (2048, 4, 128) |
| 0x14 | 1075.2 | 4 | 8 | (1024, 4, 64), (7168, 4, 64) | (128, 4, 256), (256, 4, 256), (512, 4, 256), (1024, 4, 256), (2048, 4, 128) |
| 0x15 | 1228.8 | 4 | 8 | (8192, 4, 64) | (128, 4, 256), (256, 4, 256), (512, 4, 256), (1024, 4, 256), (2048, 4, 128) |
| 0x16 | 1843.2 | 2 | 4 | (2048, 2, 64), (6144, 2, 64) | (128, 4, 256), (256, 4, 256), (512, 4, 256), (1024, 4, 256), (2048, 4, 128), (3072, 2, 64), (4096, 2, 64), (5120, 2, 64) |
| 0x17 | 2150.4 | 2 | 4 | (1024, 2, 64), (7168, 2, 64) | (128, 4, 256), (256, 4, 256), (512, 4, 256), (1024, 4, 256), (2048, 4, 128), (3072, 2, 64), (4096, 2, 64), (5120, 2, 64) |
| 0x18 | 2457.6 | 2 | 4 | (8192, 2, 64) | (128, 4, 256), (256, 4, 256), (512, 4, 256), (1024, 4, 256), (2048, 4, 128), (3072, 2, 64), (4096, 2, 64) |
| 0x19 | 3686.4 | 1 | 4 | (2048, 1, 64), (6144, 1, 64) | (128, 4, 256), (256, 4, 256), (512, 4, 256), (1024, 4, 256), (2048, 4, 128), (3072, 2, 64), (4096, 2, 64), (5120, 2, 64) |
| 0x1a | 4300.8 | 1 | 4 | (1024, 1, 64), (7168, 1, 64) | (128, 4, 256), (256, 4, 256), (512, 4, 256), (1024, 4, 2560, (2048, 4, 128), (3072, 2, 64), (4096, 2, 64), (5120, 2, 64) |
| 0x1b | 4915.2 | 1 | 4 | (8192, 1, 64) | (128, 4, 256), (256, 4, 256), (512, 4, 256), (1024, 4, 256), (2048, 4, 128), (3072, 2, 64), (4096, 2, 64), (5120, 2, 64) |

In any active slot, the 1xEV-DO forward link 504 may transmit from a base station 126-142 to an AT 202-240 using one of the transmission formats listed in Table 1C.

If the present method and apparatus is implemented in a wireless communication system employing the cdma2000 1xEV-DO forward link standard, method 300 may make two pre-superposition coding determinations at step 316. Using the first superposition coding determination, method 300 may determine at 316 whether the user 202 selected at step 312 (the most deserving user 202) has a requested DRC of less than a low threshold data rate (e.g., 307.2 kbps for the 1xEV-DO forward link standard). If the user 202 selected at step 312 has a requested DRC of less than 307.2 kbps for example, then a superposition coded packet may not be compiled since any gain on the throughput data rate based on a superposition coded packet may be negligible under such circumstances (due to overhead incurred).

Using the second superposition coding determination, if the user 202 selected at step 312 has a requested DRC approximately equal to the maximum data rate for the given system (e.g., 3,072.0 kbps for the 1xEV-DO forward link 504 standard), then a superposition coded packet is not compiled since any gain on the throughput data rate based on a superposition coded packet may be negligible under such circumstances. Thus, if any pre-superposition coding criteria have not been met at step 316, method 300 may proceed to step 318 where a superposition coded packet is not compiled. Since the requested DRC of user 202 is 475.7 kbps (see FIG. 8C), method 300 as applied to the present example may determine at 316 that pre-superposition coding criteria have been met (e.g. 307.2 kbps <most deserving user requested DRC <3,072.0 kbps).

If there are no pre-superposition coding criteria at step 314 or if all the pre-superposition coding criteria have been met at step 316, method 300 may proceed to step 320. At step 320, base station 130 may determine whether to add other user 204-240 data packets to the most deserving user 202 data packet as a superposition coded packet. To achieve this, base station 130 may compile a list of user 202-240 candidates for superposition coding at step 322. The first user 202-240 candidate chosen may be the user selected at step 312. A reason for this may be that conventional systems presently serve this most deserving user 202. By employing the user 202 selected at step 312 as the first potential user candidate for superposition coding, the present invention may be seamlessly incorporated into conventional systems without diminishing the expected operations of that system.

One way to select the remaining user 204-240 candidates is to select all remaining users 204-240. In the present example, this would mean selecting users 204 through 240 of FIG. 6. A problem with this approach is that it is unlikely that the lower ranked users (here, users 224, 230, and 226—see FIG. 8C) would be able to process a superposition coded packet in a timely manner. User 226, for example, may need to decode and re-encode the superposition packet nineteen times, a processing period that most likely would extend beyond a 1.67 millisecond time slot. A better approach may be to select the remaining user 204-240 candidates for superposition coding based on the pre-selected goal of maximizing the throughput transmission rate. This selection also minimizes the overhead required in signaling.

In one embodiment, superposition coding is limited to four users 202-240. At step 324, method 300 may select as user 202-240 candidates for superposition coding no more than four users 202-240 in descending order of their evaluation function $F_i(n)$. The order of the evaluation functions $F_i(n)$ may be ranked by a scheduler 714. From FIG. 8C, user 202 ($F_{202}(n)=45$), user 204 ($F_{204}(n)=23$), user 232 ($F_{232}(n)=22$), and user 218 ($F_{218}(n)=20$) may be selected as user 202-240 candidates for superposition coding at step 324.

At first, it would seem that the superposition coded packet may always be composed of the maximum number of users 202-240 (here, four users 202, 204, 218, 232) since the more superposition coded users 202-240, the greater the gain in throughput data rate. However, when implementing superposition coding, each participating AT 202-240 receives certain information (like initial power allocations and subsequent power updates) about the superposition coded packet. This information takes up byte space in the superposition coded packet to diminish the amount of bytes that may be allocated to the payload data messages being transmitted. A greater number of superposition coded users 202-240 may result in more overhead (amount of preamble data that needs to be transmitted as part of the superposition coded packet), thus decreasing the data throughput rate. However, a smaller number of superposition coded users 202-240 may result in a decreased data throughput rate. Thus, to maximize the data throughput rate, method 300 anticipates that the superposition coded packet may include a 2-user, 3-user, or 4-user superposition coded packet depending upon the circumstances.

It is noted that the term "users" refers to the packet-oriented formats used in 1xEV-DO. Therefore, a if a multi-user packet of 1xEV-DO is used, then, it would still be treated as 1 user, with the parameters (DRC, etc) being determined by the worst/weakest user within that multi-user packet.

At step 326, method 300 may eliminate from the user 204, 218, 232 candidates of step 324 those user candidates 204, 218, 232 who have a requested DRC that is less than the requested DRC of the most deserving user 202 (e.g., the user 202 selected in step 312). As shown in FIG. 8C, user candidates 204, 232, and 218 all have a requested DRC that is greater than the 475.7 kbps requested DRC of user 202. Thus, none of user candidates 204, 232, and 218 would be eliminated in the present example.

At step 328, method 300 may determine whether any user candidates 202, 204, 218, 232 of step 324 have identical requested DRCs. If none of the user 202, 204, 218, 232 candidates of step 324 has identical requested DRCs, then method 300 may proceed to step 334. If any user 202, 204, 218, 232 candidates of step 324 have identical requested DRCs, then method 300 may retain that step 324 user 202, 204, 218, 232 candidate with the highest average DRC (e.g., max(DRC)) as step 330. At step 332, method 300 may eliminate those remaining step 324 user 202, 204, 218, 232 candidates who had identical requested DRCs as that user 204, 218, 232 retained in step 330. As shown in FIG. 8C, user candidates 202, 204, 232, and 218 all have different requested DRCs, thus none of the user 202, 204, 218, 232 candidates of step 324 would be eliminated in the present example.

At this point, it may be helpful to provide an overview of steps 334 through 352. To select the 2-user, 3-user, or 4-user combination that maximizes the throughput transmission rate, method 300 may compute the power allocations between the user 202, 204, 218, 232 candidates for superposition coding (step 334 through step 346). Method 300 may then determine a maximum transmission rate for each user 202, 204, 218, 232 candidate combination (step 348). From this, method 300 may select the user 202, 204, 218, 232 combination that maximizes the throughput transmission rate (step 350). After selecting the 2-user, 3-user, or 4-user combination that maximizes the throughput transmission rate, method 300 may compile the superposition coded packet from the selected user 202, 204, 218, 232 combination (step 352).

Power allocations between the user candidates for superposition coding (step 334 through step 346) may be related to the maximum transmission rate for each user 202, 204, 218, 232 candidate combination (step 348). To determine the maximum transmission rate $R_i$ for each user 202, 204, 218, 232 combination, method 300 may employ the following equation:

$$R_i = \log_2\left(1 + \frac{\alpha_i P_T}{N_i + \sum_{j>i} \alpha_j P_T}\right) \quad (3)$$

where $R_i$ represents the maximum transmission rate for each user 202, 204, 218, 232 combination;

$P_T$ represents the total power used to transmit a superposition coded packet;

$\alpha$ ("alpha") represents a scalar applied to the total transmitted power $P_T$; and $N_i$ represents the noise spectral power density of the internal noise that may be contributed by a base station 126-144 to an incoming signal.

Equation 3 may be written as:

$$R_i = \log_2(1 + (E_b/N_t)) \quad (4)$$

where $E_b$ is the energy per bit; and where $E_b/N_t$ is the energy per bit per noise spectral power density and is related to the data rate DRC through the SINR by the processing gain of the system.

The $E_b/N_1$ portion of equation (4) may play a role in determining the power allocations between the user 202, 204, 218, 232 candidates for superposition coding. To determine the power allocations between the user 202, 204, 218, 232 candidates for superposition coding, method 300 may employ the following equations to obtain each $\alpha$ ("alpha") total transmission power scalar:

$$(E_b/N_t)_{drc,1} < (E_b/N_t)_{drc,2} < (E_b/N_t)_{drc,3} < (E_b/N_t)_{drc,4} \quad (5)$$

where each $(E_b/N_t)_{drc}$ is based on a requested DRC, and $$(E_b/N_t)_1 = \alpha_1 \times (E_b/N_t)_{drc,1}/[(1-\alpha_1) \times (E_b/N_t)_{drc,1} + 1] \quad (6)$$

$$(E_b/N_t)_2 = \alpha_2 \times (E_b/N_t)_{drc,2}/[(1-\alpha_1-\alpha_2) \times (E_b/N_t)_{drc,2} + 1] \quad (7)$$

$$(E_b/N_t)_3 = \alpha_3 \times (E_b/N_t)_{drc,3}/[(1-\alpha_1-\alpha_2-\alpha_3) \times (E_b/N_t)_{drc,3} + 1] \quad (8)$$

$$(E_b/N_t)_4 = \alpha_4 \times (E_b/N_t)_{drc,4}/[(1-\alpha_1-\alpha_2-\alpha_3-\alpha_4) \times (E_b/N_t)_{drc,4} + 1] \quad (9)$$

Method 300 may begin determining the power allocations between the user 202, 204, 218, 232 candidates for superposition coding at step 334. The power allocations between the user 202, 204, 218, 232 candidates for superposition coding may be determined by computing the $\alpha$ ("alpha") scalar for each remaining user 202, 204, 218, 232 candidate.

Terminals 202-240 far away from the base station 126-144 require a higher transmit power level at the base station 126-144 to achieve the same data rate as that for terminals 202-240 close to the base station 126-142 in order to overcome the additional path loss. In a 2-user superposition coded packet where 20 watts are available as the total transmitted power, a weak user 202-240 may require 19 watts of total transmitted power and a strong user 202-240 may require 1 watt of total transmitted power. Method 300 may achieve this shouting and whispering through the alpha scalar.

Preferably, method 300 assigns the $\alpha$ ("alpha") scalar from the most deserving user 202 to the strongest user 212 based on their respective requested DRC. FIG. 8B illustrates the most deserving user 202 to the strongest user 212 based on the requested DRC being ranked as follows for the remaining user candidate: user 202, user 218, user 232, and user 204. Thus, method 300 may begin by determining the power allocation of the most deserving user, here user 202.

To determine the power allocation to the most deserving user 202, method 300 may set a data rate at step 336 at which the most deserving user 202 (namely, the user 202 selected at step 312) may be served when a superposition coded packet is employed. For the 1xEV-DO forward link standard, the served data rate for the most deserving user 202 in the superposition coded packet may be the greater of 153.6 kbps and the most deserving user's 202 DRC divided by the number of users 202, 204, 218, 232 in the superposition coded packet. This may be written as:

Served Data Rate$_{(most\ deserving\ user)}$=max(153.6 kbps, (DRC$_{(most\ deserving\ user)}$/number of SP users)) (10)

In the example of FIG. 8C, the requested DRC of the most deserving user (user 202) is 475.7 kbps. Applying equation 10, Served Data Rate$_{(most\ deserving\ user)}$=max (153.6 kbps, 475.7/2, 475.7/3, 475.7/4), or Served Data Rate$_{(most\ deserving\ user)}$=max (153.6 kbps, 237.9 kbps, 158.6 kbps, 118.9 kbps), or Served Data Rate$_{(most\ deserving\ user)}$=237.9 kbps.

Knowing the Served Data Rate$_{(most\ deserving\ user)}$ and the requested DRC for the most deserving user 202 (from e.g., FIG. 8C), method 300 may employ equations to determine the $\alpha$ ("alpha") scalar for a user candidate at step 338. In the present example, method 300 may employ equation (6) above to determine the $\alpha$ ("alpha") scalar for the most deserving user 202. For user 202, the Served Data Rate was calculated from equation (10) as 237.9 kbps and the requested DRC from FIG. 8C is 475.7 kbps. Thus, for user 202, the $\alpha_{202}$ ("alpha") scalar may be calculated from equation (6) as:

$$(E_b/N_t)_1 = \alpha_1 \times (E_b/N_t)_{drc,1}/[(1-\alpha_1) \times (E_b/N_t)_{drc,1} + 1] \quad (6)$$

substituting, $$(E_b/N_t)_{202} = \alpha_{202} \times (E_b/N_t)_{drc,202}/[(1-\alpha_{202}) \times (E_b/N_t)_{drc,202} + 1] \quad (6a)$$

$$237.9\ \text{kbps} = \alpha_{202} \times 475.7\ \text{kbps}/[(1-\alpha_{202}) \times (475.7\ \text{kbps} + 1] \quad (6b)$$

$$\alpha_{202} = 0.9958 (= \alpha_1) \quad (6c)$$

At step 340, method 300 may determine whether an alpha shortage has occurred. An alpha shortage is where the sum of all alphas is equal to or greater than one. If an alpha shortage has occurred, then method 300 may assign the remaining alpha to the strongest user 202 at step 342 and may drop users 204, 218, 232 just above the primary user or strongest user 202 at step 344. This maximizes the total throughput. The method 300 then may proceed to step 348.

If an alpha shortage has not occurred, then method 300 may determine at step 346 whether there are any remaining user candidates 204, 218, 232 for which an alpha has not been calculated. If there are remaining user 204, 218, 232 candidates for which an alpha has not been calculated, method 300 returns to step 338. For the next strongest user 218, the $\alpha_{218}$ ("alpha") scalar may be calculated from equation (7) since $\alpha_1$ (here, $\alpha_{202}$) has been calculated from equation (6). The $\alpha_{232}$ scalar and the $\alpha_{204}$ scalar similarly may be determined from equation (8) and equation (9) respectively. If an alpha has been calculated for each user 202, 204, 218, 232 candidate, method 300 may proceed to step 348.

Method 300 may begin to determine the maximum transmission rate for each user 2-user, 3-user, and 4-user combination at step 348. Recall that the maximum transmission rate $R_i$ for each user 202, 204, 218, 232 combination, method 300 may employ the following equation:

$$R_i = \log_2\left(1 + \frac{\alpha_i P_T}{N_i + \sum_{j>i} \alpha_j P_T}\right) \quad (3)$$

For user 202, 204, 218, 232 candidates 1, 2, 3, and 4, method 300 may employ the following equations to determine the maximum transmission rate for each user 202, 204, 218, 232 candidate combination:

$$R_4 = \log_2\left(1 + \frac{\alpha_4 P_T}{N_4}\right) \quad (11)$$

$$R_3 = \log_2\left(1 + \frac{\alpha_3 P_T}{N_3 + \alpha_4 P_T}\right) \quad (12)$$

$$R_2 = \log_2\left(1 + \frac{\alpha_2 P_T}{N_2 + \alpha_3 P_T + \alpha_4 P_T}\right) \quad (13)$$

$$R_1 = \log_2\left(1 + \frac{\alpha_1 P_T}{N_1 + \alpha_2 P_T + \alpha_3 P_T + \alpha_4 P_T}\right) \quad (14)$$

Each of the variables in equations (11) through (14) may be known at this point in the process. The alpha α power transmission scalar for each user 202, 204, 218, 232 candidate may have been determined during step 334 through step 346. The total transmission power $P_T$ typically may be assigned by the wireless communication system. The noise spectral power density N for each user 202, 204, 218, 232 candidate is the internal base station noise that may be contributed by a base station 126-142 to each user 202, 204, 218, 232 candidate's incoming signal and thus is known (possibly through the DRC requested). By employing equations (11) through (14), the maximum transmission rate for each user 202, 204, 218, 232 candidate combination may be determined at step 348.

At step 350, method 300 may select the user 202, 204, 218, 232 combination that maximizes the throughput transmission rate. For example, if $R_2$=70 kbps for a 2-user superposition coded packet, $R_3$=80 kbps for a 3-user superposition coded packet, and $R_4$=75 kbps for a 4-user superposition coded packet, method 300 may select the 3-user superposition coded packet since the 3-user superposition has the largest kbps and thus maximizes the throughput transmission rate.

At step 352, method 300 may compile the superposition coded packet from the selected user 202, 204, 218, 232 combination. The superposition coded packet may include a payload and a preamble. The payload may include each data packet for the users 202, 204, 218, 232 included in the selected user 202, 204, 218, 232 combination. The preamble (or address header) may convey superposition coded parameters of the packet and non-superposition coded parameters of the packet.

The process of power allocation has been explained in an example where the layers are either CDMA or OFDM (all data tones in a particular layer are allocated to a particular user/multi-user packet (MUP)). In case the lowest layer is CDMA and the second layer is OFDMA, with groups of tones allocated to different users, the power allocation for the lowest layer remains identical to that described above. However, the second layer can follow an OFDMA allocation policy, which jointly determines the power and tone allocation to the set of chosen users, depending on the target rate for the users. The final packet structure resembles FIG. 9F.

Superposition coded packet parameters may include: (a) the number of users 202, 204, 218, 232 in the superposition coded packet; (b) the length (nominal # of interlace slots) of the superposition coded packet; (c) the fractional power allocation ($\alpha_i$) for each superposition coded packet user "i"; (d) the payload size for each superposition coded packet user 202, 204, 218, 232; (e) the physical address of each superposition coded user 202, 204, 218, 232; and (f) an indicator of whether the packet is a single-user data packet, a multi-user data packet, or a multi-user, superposition coded packet.

A two bit code may be needed to indicate the number of users ($2=01_2$, $3=10_2$, $4=11_2$) in the superposition coded packet. The length (nominal # of interlace slots) of the superposition coded packet also may be indicated by two bits of code. The fractional power allocation ($\alpha_i$) for each superposition coded packet user "i" may be conveyed by 3-bits and the payload size (the type of packet) for each superposition coded packet user may be conveyed by 2-bits. Seven bits may be allocated to convey a physical address (e.g., Medium Access Control Identifier (MAC ID)) of each superposition coded user.

An AT 202-240 may utilize the number of users 202, 204, 218, 232 to determine whether the packet is a single-user data packet ($00_2$) or a multi-user packet ($01_2$, $10_2$, $11_2$). If the packet is a multi-user packet, then the AT 202-240 may utilize the power allocation to distinguish between a multi-user data packet and a multi-user, superposition coded packet. A multi-user data packet always is transmitted at full power ($P_T$) and a multi-user, superposition coded packet is transmitted by scaled power ($\alpha P_T$).

Other packet parameters (non-superposition coded packet parameters) may be conveyed by the preamble depending on the communication standard in which the present method and apparatus is employed. In order to incorporate the superposition coding strategy, the preamble may distinguish the superposition coded packet from the other types of data packets, such as single user packet, multi-user packet, control channel packet, and broadcast packet.

Conveying preamble information is viewed as overhead in that packet bit space allocated preamble information takes away packet bit space that may be allocated to the payload. As discussed in more detail below, the most deserving user 202 may process the superposition coded packet without information regarding the superposition coded packet parameters. Thus, the superposition coded packet may be compiled such that the most deserving user 202 may not receive any superposition coded packet parameter information in the preamble, but still may receive non-superposition coded packet parameters in the preamble. Table 2 below illustrates an example superposition coded packet structure for a 3-user superposition coded packet with the bit allocation shown in parenthesize:

TABLE 2

EXAMPLE 3-USER SUPERPOSITION CODED PACKET STRUCTURE

| USER | Superposition Coded (SPC) Packet Parameters | | | | | | | | | | non-SPC parameters | Payload |
|---|---|---|---|---|---|---|---|---|---|---|---|---|
| #1 | (0) | | | | | | | | | | non-SPC parameters (20) | Data Packets 1(4096) 2(1024) 3(1024) |
| #2 | # SPC Users #1 (2) | MAC ID SP #1 (7) | $\alpha_1$ (3) | Payload size (2) | MAC ID SP #2 (7) | $\alpha_2$ (3) | Payload size (2) | MAC ID SP #3 (7) | $\alpha_3$ (3) | Payload size (2) | non-SPC parameters (20) | Data Packets 1(4096) 2(1024) 3(1024) |
| #3 | # SPC Users #1 (2) | MAC ID SP #1 (7) | $\alpha_1$ (3) | Payload size (2) | MAC ID SP #2 (7) | $\alpha_2$ (3) | Payload size (2) | MAC ID SP #3 (7) | $\alpha_3$ (3) | Payload size (2) | non-SPC parameters (20) | Data Packets 1(4096) 2(1024) 3(1024) |

Each of these packets can be constructed using a different wireless communication standard.

Figure 9A:
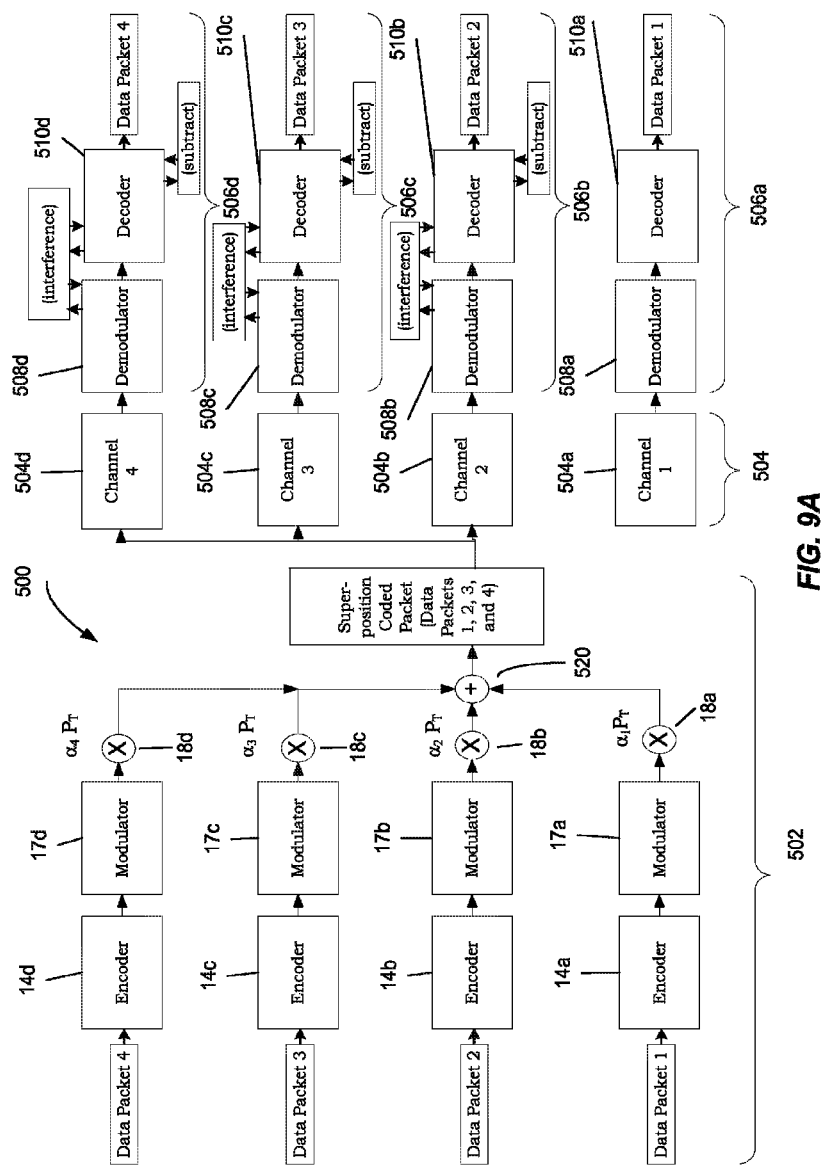
FIG. 9A is a logic block diagram for the apparatuses used to compile, transmit, and process a superposition coded packet.

FIG. 9A is a logic block diagram 500 of the apparatuses used to compile, transmit, process and receive a superposition coded packet. Individual data packets may be encoded in encoders 14a-14d respectively, modulated in modulators 17a-17d respectively, transmission power (alpha "α") scaled (namely, $\alpha_i P_T$) by multiplying the encoded and modulated data packets by α applied to the total transmitted power $P_T$, in multipliers 18a-18d respectfully. The resultant packets are then added together in adder 520 to compile a superposition coded packet in transmitter 502. The superposition coded packet may then be transmitted over each forward link channel 504a-504d. Each AT 202, 204, 218, 232 may then receive and process the superposition coded packet in receiver demodulators 508a-508d and decoders 510a-510d respectfully found in receivers 506a-506d respectfully. To process a superposition coded packet, the decoder 510a-510b treats the data packets for stronger users 202, 204, 218, 232 as interference and (ii) decodes and subtracts out data packets meant for weaker users 202, 204, 218, 232.

Figure 9B:
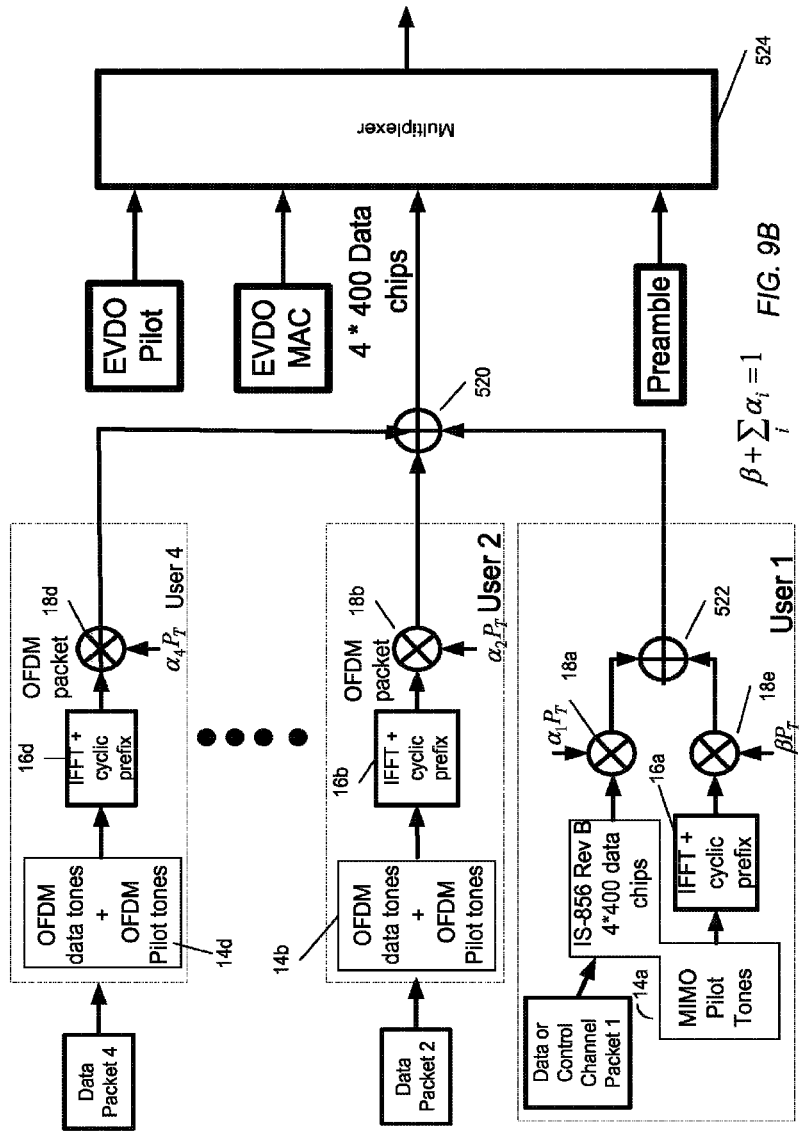
FIG. 9B is an example of a logic block diagram for the apparatuses used to compile, and transmit a superposition coded packet, where the various users improve spectral efficiency by utilizing different modulation methods.

FIG. 9B is an example which elaborates on transmitter 502 of FIG. 9A, where the various users 202, 204, 218, 232 utilize different wireless communication standards in order to achieve better spectral efficiency. In one case the most deserving user 202 utilizes a 1xEV-DO Rev B format and other users 204, 218, 232 utilize OFDM packet formats. FIG. 9B shows, for example, Data Packet 1 encoded with an a 1xEV-DO Rev B format, while data packets 2 through 4 are encoded using utilizing an OFDM format. FIG. 9B also shows an inverse Fourier transform (IFFT) applied by digital signal processors (DSP) 16a-16d to OFDM pilot tones and to the frequency domain symbols produced by encoders 14b-14d producing digital time-domain OFDM symbols. DSPs 16a-16d may also perform additional spectral shaping on the digital time-domain OFDM symbols and add a cyclic prefix or guard interval. In addition, data packets are transmission power (alpha "α") scaled (namely, $\alpha_i P_T$) by multiplying them by a applied to the total transmitted power $P_T$, in multipliers 18a-18d respectfully. The OFDM pilot tones are scaled by multiplying them by beta β applied to the total transmitted power $P_T$, in multiplier 18e. FIG. 9B also shows a 1xEV-DO formatted data packet 1 being combined with the processed OFDM Pilot tones in summer 522. As illustrated in FIG. 9B, packet 1 may be a 1xEV-DO data packet or a 1xEV-DO control channel packet.

The four data packets are then combined in summer 520. The output of summer 520 is input to multiplexer 524 along with an 1xEV-DO pilot, a MAC and a preamble signal to produce the superposition coded packet.

Figure 9C:
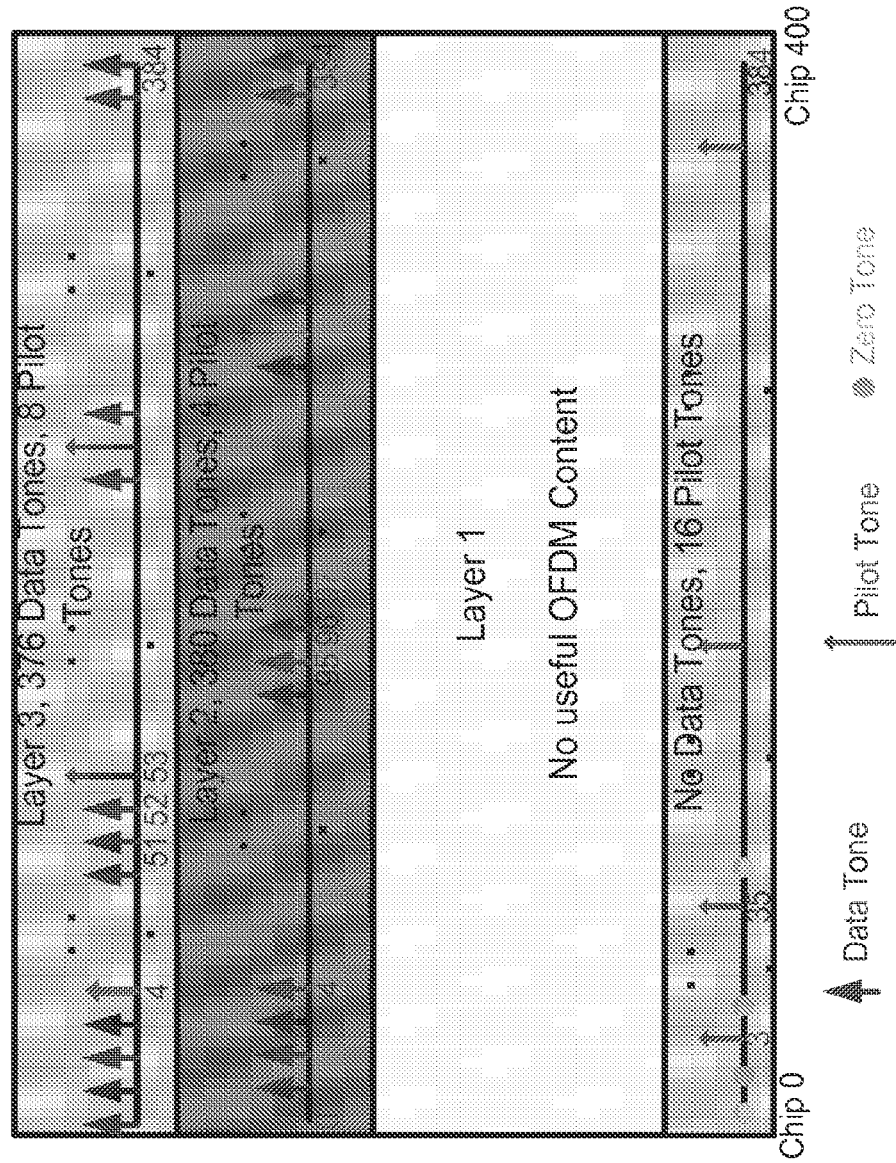
FIG. 9C shows how the various packets are fit in time-domain, with each user receiving a fraction of the power.
Figure 9D:
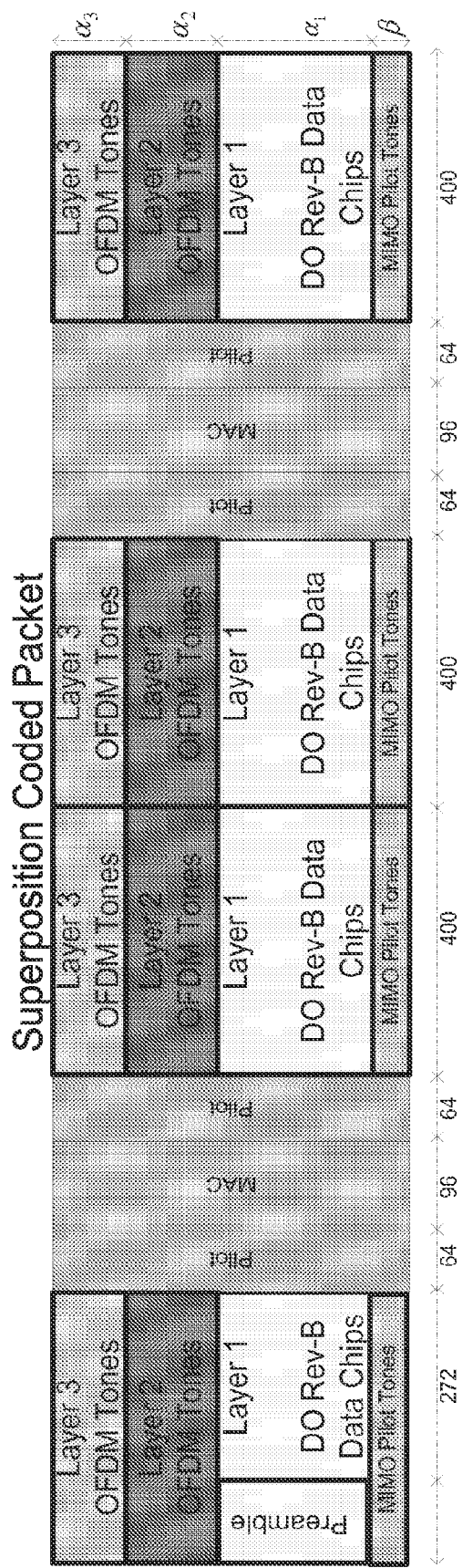
FIG. 9D illustrates a 1xEV-DO forward link slot format used in one embodiment of the present method and apparatus.

FIGS. 9C and 9D provide an example of the data content in the time and frequency domains. FIG. 9C shows how the various packets are fit in the time-domain, with each user 202-240 receiving a fraction of the power. With layered coding, the base stream is encoded and modulated in accordance with a first mode to generate a first modulation symbol stream, a second stream is encoded and modulated in accordance with a second mode to generate a second modulation symbol stream and so on. The first and second modes may be the same or different. The multiple modulation symbol streams are then combined to obtain one data symbol stream. Additional layers, like the MIMO-pilot may also be accommodated.

FIG. 9C illustrates a mixed slot containing data using different packet formats. The base stream is shown in as a layer comprising 16 pilot tones. The first layer of the time slot contains no useful OFDM content, and the second and third layers use an OFDM format. In one embodiment, the first layer may be encoded with an 1xEV-DO Rev B format. It is called a mixed slot because data for one or more physical channels may be channelized with different formats. In this embodiment, the first layer may be added to the two OFDM waveforms to generate a composite waveform that is transmitted in the mixed slot. The example in FIG. 9C is used to illustrate that the various users 202-140 may use different wireless communication standards to construct their data packets.

FIG. 9D illustrates a 1xEV-DO forward link slot format used in one embodiment of the present method and apparatus. As shown, this slot format supports four channels: pilot, MAC, control, and traffic. These are time-multiplexed within each slot (1.66 ... ms) as shown in FIG. 9D.

The pilot channel carries no information but is used to aid in the detection, synchronization, and demodulation of the signal at the receiver end. The MAC channel uses CDMA (it employs Walsh codes of length 64) and carries control information (such as power control bits) to individual access terminals 202-240.

The remaining parts of the slot are used for data, transmitting either the control or traffic channel. As shown, the control channel carries control information, transmitted periodically, broadcast to mobile phones. The traffic channel carries packets of user data. The traffic or data channel is a mixed slot containing data using different packet formats. The base stream is shown as a layer comprising MIMO-pilot tones which is scaled by scaling factor β. The next three layers are data or traffic streams. The first layer uses a 1xEV-DO Rev B packet format, and the second and third layers use an OFDM format. The scaling factor α for each user is shown as $\alpha_1$, $\alpha_2$, $\alpha_3$, and $\alpha_4$. Four data channels, each containing 400 chips is shown. In the first data channel, the first 128 chips are reserved for the preamble while the other 272 chips are used for the 1xEV-DO data chips and the OFDM tones. In the three other data channels, 400 chips are used for the 1xEV-DO data chips and the OFDM tones. The MIMO pilot tones may be present (β≠0) in order to assist channel estimation in multi-antenna systems. This is not related to the present embodiment, but is included to faithfully describe a practical system. When the MIMO pilot is present, all layers are going to treat it as interference.

Figure 9E:
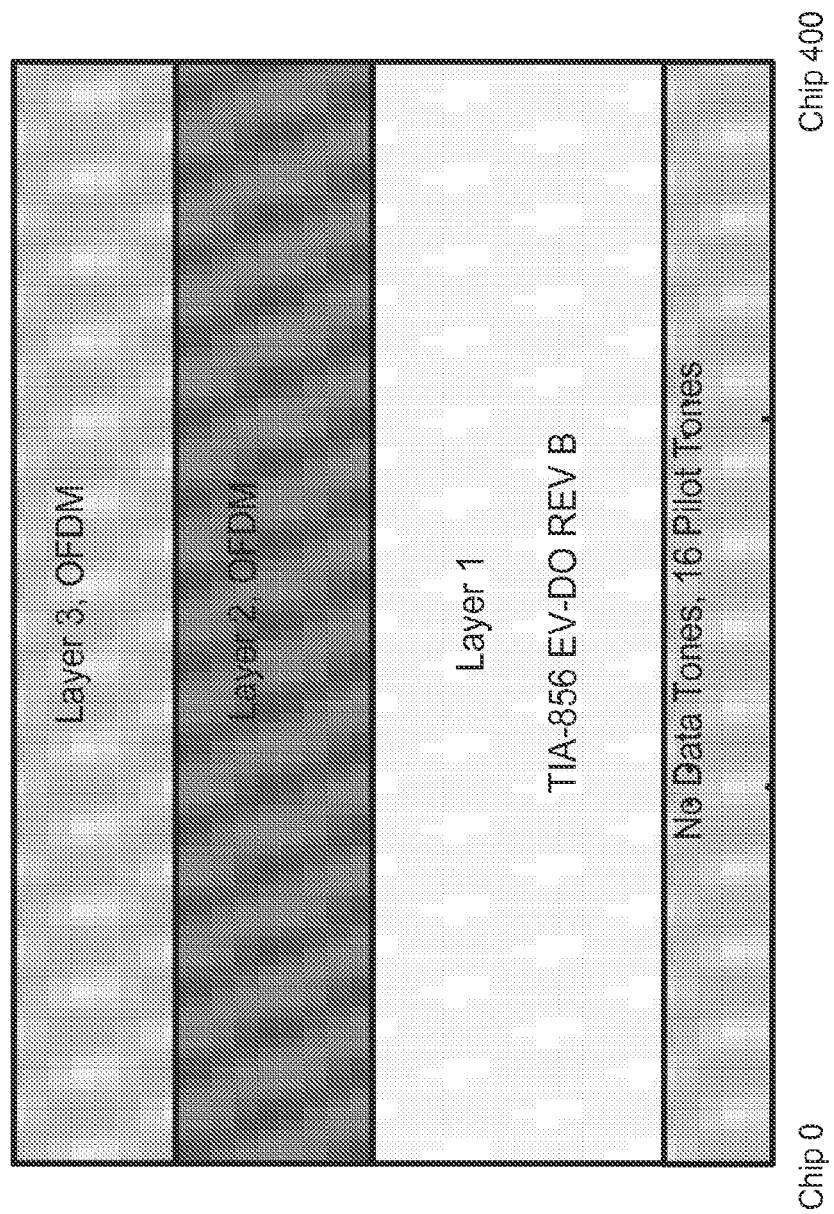
FIG. 9E illustrates a mixed data slot using different packet formats.

FIG. 9E illustrates a mixed data slot using different packet formats. The base stream is shown in as a layer comprising MIMO pilot tones. The first layer of the time slot uses a 1xEV-DO packet format, and the second and third layers use a OFDM format. In this embodiment, the first layer may be added to layers 2 and 3 to generate a composite waveform that is transmitted in the mixed slot.

Figure 9G:
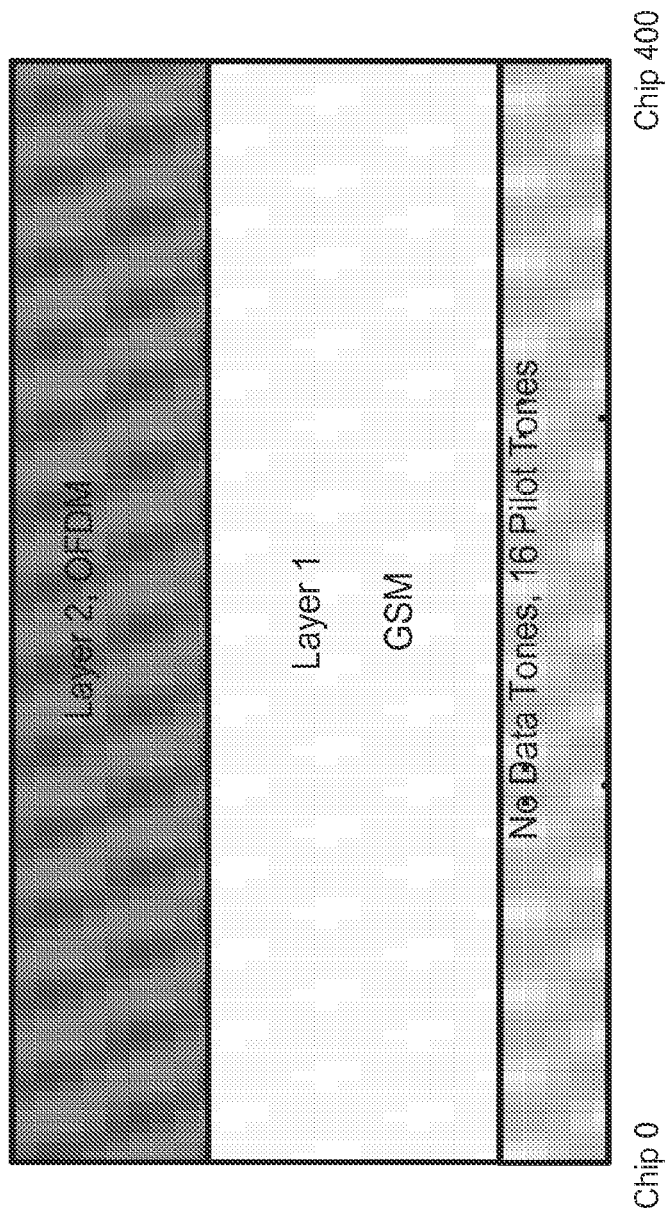
FIG. 9G illustrates a mixed data slot where one layer uses a GSM packet format.

FIG. 9G illustrates another mixed data slot using different packet formats. The base stream is shown in as a layer comprising MIMO pilot tones. The first layer of the time slot uses a GSM format and the second layer use a OFDM format. In this embodiment, the first layer may be added to layer 2 to generate a composite waveform that is transmitted in the mixed slot.

FIG. 10 is a method 600 to compile, transmit, and process one or more data packets. Base station 130 may determine whether to compile a single-user data packet, a multi-user data packet transmitted at full power, or a multi-user, superposition coded packet transmitted by scaled power ($\alpha P_T$). At step 602, base station 130 may determine whether to compile a superposition coded packet transmitted by scaled power ($\alpha P_T$). Base station 130 may make this determination based on method 300. If base station 130 decides to compile a single-user data packet or a multi-user data packet transmitted at full power, method 600 may proceed to step 604 where base station 130 may compile the desired data packet. From step 604, method 600 may proceed to step 608.

If base station 130 decides at step 602 to compile a multi-user, superposition coded packet, method 600 may proceed to step 606. At step 606, method 600 may compile the superposition coded packet from a selected user 202-240 combination. This may be achieved by employing method 300. At step 608, method 600 may transmit the superposition coded packet over a forward link channel 504 to each user 202-240 in the selected user 202-240 combination. Each user in the selected user 202-240 combination may receive the superposition coded packet at step 610.

In the present example, assume that data packets for all four users 202, 204, 232, and 218 are contained within the superposition coded packet. For a user 202, 204, 232, and 218 to obtain the data packet meant for that user 202, 204, 232, and 218, the user may process the superposition coded packet. Thus, at step 612, each user 202, 204, 232, and 218 may begin processing the received superposition coded packet.

As a first step in processing the received superposition coded packet, each user 202, 204, 232, and 218 may read the preamble at step 614. As noted above, the most deserving user 202, 204, 232, and 218 need not receive any superposition coded packet parameter information in the preamble to process the superposition coded packet.

At 616, each user may determine whether that user 202, 204, 232, and 218 is the most deserving user 202. For example, if the received preamble contains superposition coded packet parameters (the MAC ID), then that user 202, 204, 232, and 218 may know that it is not the most deserving user 202 and method 600 may proceed to step 622. If the received preamble does not contain any superposition coded packet parameters, then that user 202, 204, 232, and 218 may know it is the most deserving user 202. In one embodiment, the super-position coded packet contains a multi-user packet which is transmitted to the most deserving user with less than 100% power allocation. This multi-user packet also contains information about the superposed users 202, 204, 232, and 218 and their payload size and initial power allocation.

If a user 202, 204, 232, and 218 determines that it is the most deserving user 202 at step 616, then that user 202, 204, 232, and 218 may attempt to process the received packet at 618 by assuming that one hundred percent of the total transmitted power was allocated to the most deserving user 202. If ultimately successful, then this means that the received packet was either a single-user data packet (α=1.00), a multi-user data packet transmitted at full power (α=1.00), or a superposition coded packet in which the disparity between the most deserving user's 202, 204, 232, and 218 SINR and the next most deserving user's 204, 232, and 218 SINR was so large that nearly all of the transmitted power was allocated to the most deserving user 202. The most deserving user 202 also may attempt to process the received packet at 620 by assuming that sixty percent of the total transmitted power was allocated to the most deserving user 202. From step 618 and 620, method 600 may proceed to step 622.

To process a superposition coded packet at step 622, a user (i) treats the data packets for stronger users 202, 204, 218, 232 as interference and (ii) decodes and subtracts out data packets meant for weaker users 202, 204, 218, 232. By subtracting out weaker user 202, 204, 218, 232 data packets, each user may obtain the data packet intended for that user 202, 204, 218, 232.

Treating data packets as interference and canceling such data packets may be achieved by successive interference cancellation. In Successive Interference Cancellation (SIC), each user's 202, 204, 218, 232 signal may be demodulated and canceled in order from the most deserving signal to the strongest signal according to their scaled transmission power ($\alpha_i P_T$) value. The scaled transmission power value is known since each scaled transmission power value is transmitted as part of the preamble to the superposition coded packet. The successive cancellations of the interference may be carried out as follows:

i) Recognize the weaker signal(s);
   ii) Decode the weaker user(s) 202, 204, 218, 232;
   iii) Determine the amplitude of the decoded user 202, 204, 218, 232 from the superposition coding parameters;
   iv) Regenerate (re-construct or re-encode) the weaker user(s)' 202, 204, 218, 232 signal. This re-construction should take into account the wireless communication standard that was used in constructing the data packet for the corresponding weaker user 202, 204, 218, 232;
   v) Cancel the weaker user 202, 204, 218, 232; and
   vi) Repeat until all weaker users 202, 204, 218, 232 are decoded.

Thus, to process the superposition coded packet at step 622, method 600 may cancel out stronger user(s) 202, 204, 218, 232 data packets at step 624 and subtract out weaker user 202, 204, 218, 232 data packets at step 626 to process a superposition coded packet. In the present example, user 202 treat all other users 202, 204, 218, 232 as interference since user 202 is the most deserving user 202. Table 3 below identifies the technique each of users 202, 204, 232, and 218 may employ to obtain the desired data packet from the superposition coded packet:

TABLE 3

SUPERPOSITION CODED PACKET PROCESSING

PACKETS

| USERS | PAC 218 | PAC 232 | PAC 204 | PAC 202 |
|---|---|---|---|---|
| USER 202 | Treat as interference | | | (—) |
| USER 204 | treat as interference | (—) | | Subtract |
| USER 232 | treat as interference | (—) | subtract | Subtract |
| USER 218 | (—) | subtract | subtract | Subtract |

During the processing of a data packet, an AT decoder 506 may correctly process the data packet. Alternatively, the AT decoder 506 may detect errors and be unable to process the data packet correctly. In either case, the AT 202, 204, 218, 232 may send an Acknowledgement (positive or negative) to the base station 126-142 to inform the base station 126-142 of the ATs 202, 204, 218, 232 success in processing a data packet. However, this may not be used with a super position coded information packet. In one embodiment, an on-off keying modulation (OOK) ACK (similar to that used for MUP) may be used, where a 1 implies an ACK (positive acknowledgement) and a 0 implies a NAK (negative acknowledgement).

Automatic Repeat Request (ARQ) schemes provide for an automatic retransmission of data. Hybrid ARQ (H-ARQ) systems allow for early termination of such retransmissions when data is decoded correctly. The receiver AT 202, 204, 218, 232 may inform the transmitter base station 126-142 as to whether the base station 126-142 needs to re-send a data packet to that particular AT 202, 204, 218, 232. A positive Acknowledgement (ACK) may be returned when the data is received correctly and a Negative Acknowledgement (NACK) may be returned when an error is detected. A negative acknowledgement may be silence (no return ARQ) and a positive acknowledgement may be a return ARQ. In a more complex error control system, information blocks may be encoded for partial error correction at the AT 202, 204, 218, 232 receiver and additional, uncorrected errors may be retransmitted by the base station 126-142. Method 600 may utilize a variety of error control systems and each user AT 202, 204, 218, 232 may send an ARQ back to the base station 126-142 at step 628.

At step 630, base station 130 may receive each ARQ from the superposition coded packet users 202, 204, 218, 232. Recall that the total transmit power ($P_T$) behind the superposition coded packet is allocated to each data packet contained in the superposition coded packet based on the alpha a scalar (namely, $\alpha_i P_T$). If a user 202, 204, 218, 232 correctly receives data from a data packet, then the base station 130 need not resend that user its particular data packet. Thus, if a user 202, 204, 218, 232 terminates their request for re-transmission of a data packet before the last slot of the slot interlace, the transmit power originally allocated to that user 202, 204, 218, 232 may be redistributed among the remaining users 202, 204, 218, 232. This may be referred to as dynamic alpha updating.

During each interlace slot, method 600 may re-send those data packets for which an NACK-ARQ was received. Table 4 below illustrates an example 4-slot interlace:

TABLE 4

FOUR-SLOT INTERLACE

| USERS\SLOTS | SLOT #1 | SLOT #2 | SLOT #3 | SLOT #4 |
|---|---|---|---|---|
| U1: USER 202 | X | X | X | √ |
| U2: USER 204 | √ | (-) | (-) | (-) |
| U3: USER 232 | X | X | √ | (-) |
| U4: USER 218 | X | √ | (-) | (-) |

The users 202, 204, 218, 232 listed in Table 4 are arranged from the most deserving user 202 (lowest reported SINR) to the strongest user 218 (highest reported SINR). After the completion of the first interlace slot, user 2 (user 204) correctly received data from the superposition coded packet and the remaining users 202, 218, 232 (1, 3, and 4) experienced errors. A reason user 2 (204) correctly received data from the superposition coded packet after the first interlace slot may be that user 2 (204) had better forward link channel than predicted.

Base station 130 may allocate the transmission power for user 2 (user 204) to user 3 (user 232) as indicated by the arrow in Table 4. After the second interlace slot, user 4 (218) correctly received data. Thus, base station 130 allocated the transmission power for early terminating user 4 (218) to the user who both experienced errors and requested the next highest SINR, namely user 3 (232). After the third interlace slot, user 3 (232) correctly received data and base station 130 allocated the transmission power for user 3 (232) to user 1 (202).

In view of the above, method 600 may determine at step 632 whether all users 202, 204, 218, 232 correctly received the data from their data packet. If all users 202, 204, 218, 232 correctly received the data from their data packet, then method 600 may proceed to step 638 and terminate. If all users 202, 204, 218, 232 did not correctly receive the data from their data packet, then method 600 may identify at step 634 those users 202, 204, 218, 232 who correctly received the data from their data packet. For each successful decoding user identified in step 634, method 600 may reallocate at step 636 the power transmission of each successful decoding user 202, 204, 218, 232 to the unsuccessful decoding user 202, 204, 218, 232 having the next higher SINR. Method 600 then may return to step 602 and compile a data packet for the next time slot interlace.

On returning to step 602, base station 130 may determine whether to compile a single-user data packet or a multi-user, superposition coded packet based on the ARQs received by base station 130 in step 630. If only one user 202, 204, 218, 232 experienced errors in decoding its data packet, then base station 130 need only compile a single-user data packet. Moreover, in compiling the data packet for the next time slot interlace, some of the preamble bits may be discarded since there may be less data packets to send during the particular time slot interlace. Discarding preamble bits may reduce the amount of data to be transmitted and therefore increase the rate at which that data may be transmitted. Method 600 may repeat in this fashion until all users 202, 204, 218, 232 correctly receive the data from their data packet.

As disclosed above, an early termination due to ARQ may result in power reallocation. On a layer level, transmission for layer 2 will terminate early only if all layer 2 users acknowledge receipt of their packet. Likewise, transmission for layer 1 terminates only if all layer 2 users and layer 1 users acknowledge receipt of their packet. The demodulated SINR is measured using embedded OFDM pilot tones. Thus, if one of the packets in layer 2, for example, is decoded, power allocation to other layers is detected due to these embedded OFDM pilot tones.

It is noted that an AT 202, 204, 232 and 218 may determine that a packet is superposition coded after the multi-user packet is decoded.

The present method and apparatus may be embodied in a computer chip for the base station 126-142 to address the compiling, transmitting, and retransmitting of a superposition coded packet and a computer chip for each AT 202-240 to address the processing of a received superposition coded packet 126-142. This may require invoking the scaling and adding features of an existing base station computer chip and including a decoder, subtractor, and re-encoder in existing AT 202-240 computer chips. The method and apparatus may be employed each time the base station 126-142 computer chip compiles a superposition coded packet, where the owner of the present method and apparatus may charge a fee each time the base station 126-142 computer chip compiles a superposition coded packet.

Figure 11:
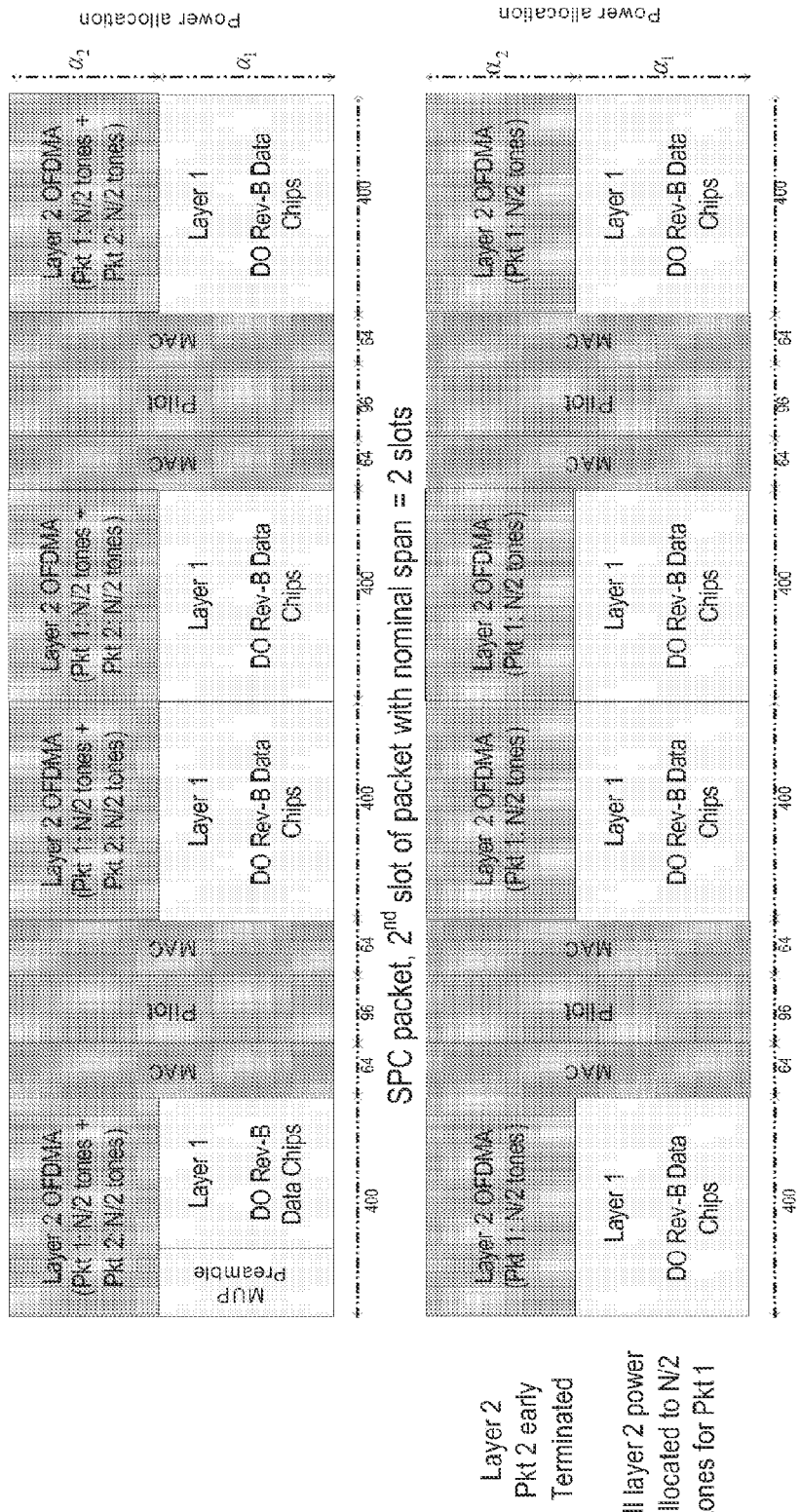
FIG. 11 is an example of two layer OFDMA superposition coding packet with a nominal span equal to two slots.

In one embodiment, the superposition coded packet may be limited to two layers, which may be an example of two layer OFDMA superposition coding or 2-layer OFDMA-SPC (See FIG. 11). FIG. 11 is an example of two layer OFDMA superposition coding packet with a nominal span equal to two slots. It has a maximum of 2-layers which simplifies terminal interference cancellation. In addition, it may use OFDMA in the higher layer which simplifies power re-allocation. Thus, when decoding the lowest layer, layer 2 is treated as interference. In FIG. 9H, $\alpha_1$ indicates the power allocated to the lowest layer, while $\alpha_2$ indicates the power allocated to layer 2 where the power allocation is split amongst the tones (up to 4 packets in layer 2).

The lower layer may utilize a 1xEV-DO multi-user format and the higher layer may utilize an OFDM packet format. In one embodiment, the lower layer uses 1xEV-DO Rev A/B multi-user packet. FIG. 9H illustrates the higher layer with two users allocated 50% of the bandwidth each. However, in another embodiment, up to four users served on the higher layer.

The lowest layer may be a 1xEV-DO or control channel packet. The preamble power allocation may be equal to the power allocated for the lowest layer data transmission. It is noted that an AT 202, 204, 232 and 218 may determine that a packet is superposition coded after the multi-user packet is decoded.

A MAC-ID is used to indicate that the packet is a superposition coded information packet. Also, it uses 2 bits to indicate the number of packets in layer 2, (i.e., 1, 2, 3, or 4 in one embodiment) and 2 bits to indicate the packet termination target.

In addition, layer 2 uses two bits to indicate the number of users in layer 2. Also, it uses an eight bit MAC index, four bits to convey the assigned distributed tone sets/user, four bits to convey initial power allocation (same across all assigned tones) and payload size may be conveyed by four bits also.

Figure 12:
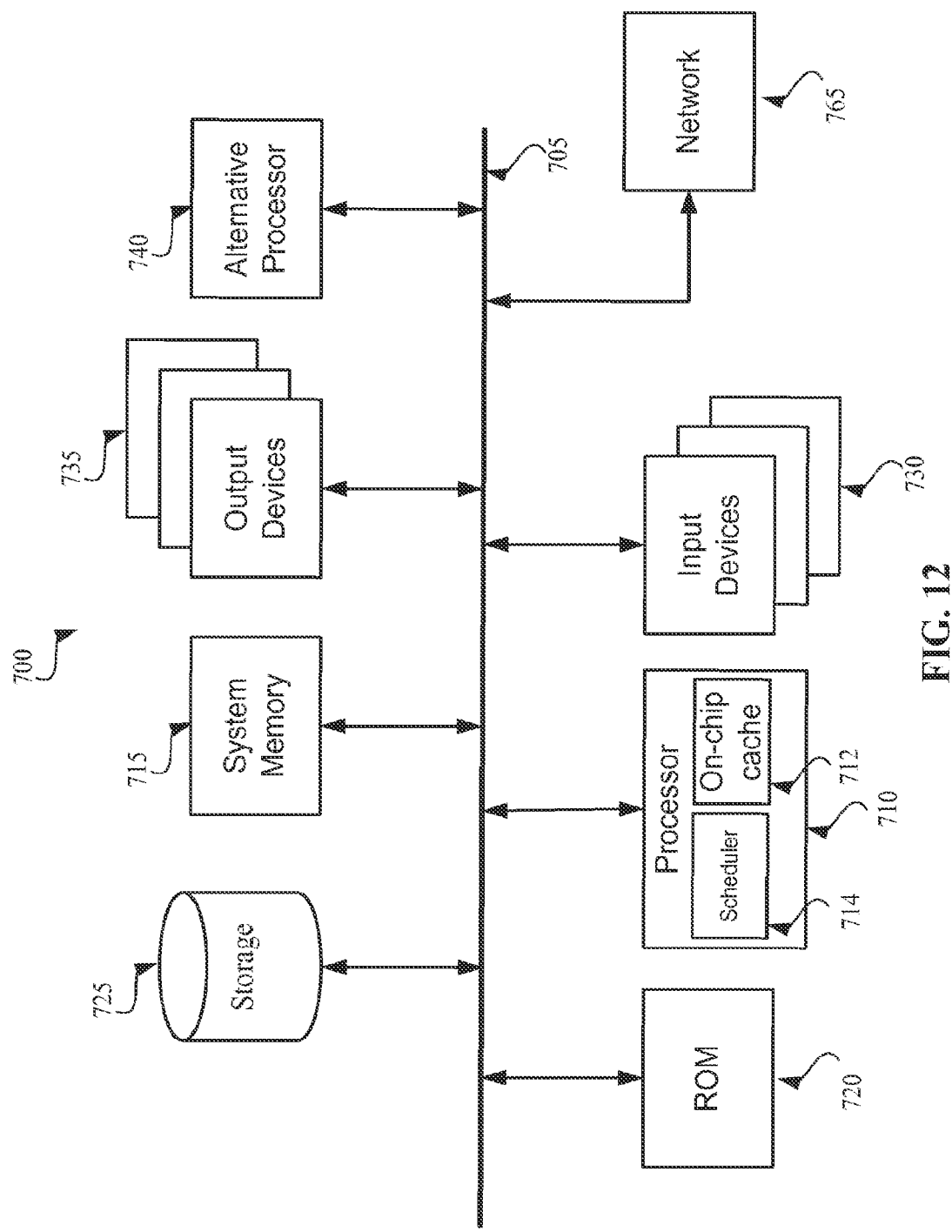
FIG. 12 is a computer system 700 with which some embodiments of the present method and apparatus may be implemented.

FIG. 12 is a computer system 700 with which some embodiments of the invention may be implemented. In some embodiments, the techniques of the present invention may be hard-coded into hardware devices dedicated specifically for graphics production and/or implemented in computer executable instructions stored in a computer readable medium (software).

The computer system 700 may include a bus 705, a processor 710, a system memory 715, a read-only memory 720, a permanent storage device 725, input devices 730, output devices 735, and an alternative processor 740. Some or all of the items of computer system 700 may be included in a compiling unit or included in a control processor.

The bus 705 may collectively represent all system, peripheral, and chipset buses that communicatively connect the numerous internal devices of the computer system 700. For instance, the bus 705 may communicatively connect the processor 710 with the read-only memory 720, the system memory 715, and the permanent storage device 725.

The Read-Only-Memory (ROM) 720 may store static data and instructions which may be needed by the processor 710 and other modules of the computer system. The permanent storage device 725, on the other hand, may be a read-and-write memory device. This device may be a non-volatile memory unit that stores instruction and data even when the computer system 700 may be off. Some embodiments of the invention may utilize a mass-storage device (such as a magnetic or optical disk and its corresponding disk drive) as the permanent storage device 725. Other embodiments may utilize a removable storage device (such as a floppy disk or other storage disk, and corresponding disk drive) as the permanent storage device.

Like the permanent storage device 725, the system memory 715 may be a read-and-write memory device. However, unlike storage device 725, the system memory may be a volatile read-and-write memory, such as a random access memory (RAM). The system memory may store some of the instructions and data that the processor needs at runtime.

In some embodiments, instructions and/or data needed to perform methods of the present patent application may be stored in the system memory 715, the permanent storage device 725, the read-only memory 720, or any combination of the three. For example, the various memory units may contain instructions of an application and/or graphics data generated by the application. For example, the steps illustrated in FIGS. 7 and 10 may be stored as instructions stored in the system memory 715, the permanent storage device 725, the read-only memory 720, or any combination of the three. In some embodiments, the system memory 715 and/or the permanent storage device 725 may comprise a cache and/or buffer.

From these various memory units, the processor 710 may retrieve instructions to execute and data to process to perform the processes of the present invention. In some embodiments, the processor 710 may utilize an on-chip cache 712 to hold data recently accessed or produced by the processor 710. In some embodiments, the alternative processor 740 may execute instructions and processes data to perform the processes of the present invention. In one embodiment, the processor may comprise scheduler 714. The scheduler 714 may also be located in alternative processor 740 or as a separate processing means.

The bus 705 also may connect to the input and output devices 730 and 735. The input devices 730 may enable a user to communicate information and select commands to the computer system 700. The input devices 730 may include alphanumeric keyboards and cursor-controllers. The output devices 735 may print or display images generated by the computer system 700. The output devices may include printers and display devices, such as Cathode Ray Tubes (CRT) or Liquid Crystal Displays (LCD).

Finally, as shown in FIG. 12, the bus 705 also may couple the computer system 700 to a network 765 through, for example, a network adapter (not shown). In this manner, the computer system 700 may be a part of a network of computers (such as a Local Area Network ("LAN"), a Wide Area Network ("WAN"), or an Intranet) or a network of networks (such as the Internet). Any or all of the components of the computer system 700 may be used in conjunction with the present invention. However, one of ordinary skill in the art would appreciate that any other system configuration also may be used in conjunction with the present invention.

Figure 13:
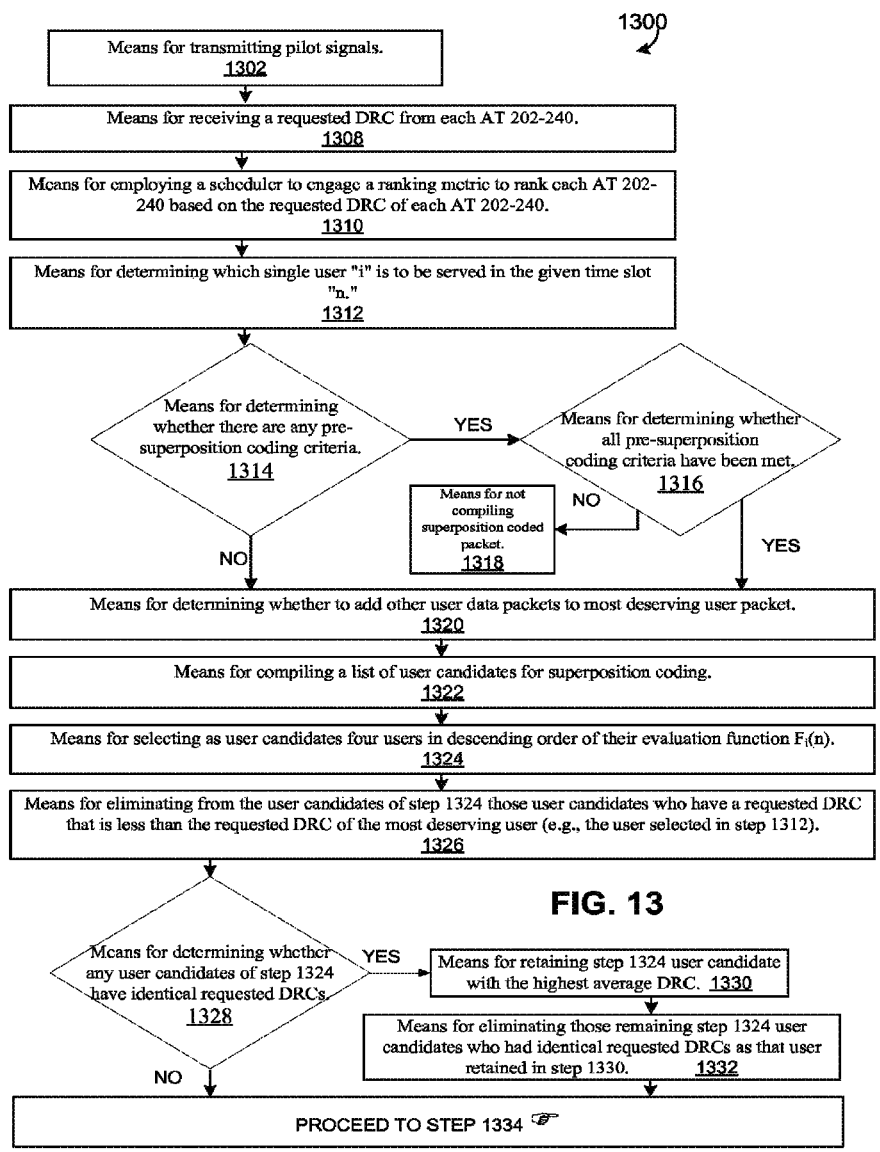
FIG. 13 is block diagram comprising means plus function blocks used to compile fixed length information packets into a superposition coded packet having an address header.

The method and apparatuses of FIGS. 7 and 10 described above are performed by corresponding means plus function blocks illustrated in FIGS. 13 and 14 respectively. In other words, steps 302 to 352 of FIG. 7 correspond to means plus function blocks 1302 to 1352 in FIG. 13. Likewise, steps 602 to 638 of FIG. 10 correspond to means plus function blocks 1602 to 1638 in FIG. 14.

The above method and apparatus is expected to provide throughput gains in a variety of systems, including Evolution-Data Only (Time Division Multiplexing) (EV-DO (TDM)), Orthogonal Frequency Division Multiplexing (OFDM (TDM OFDM)), and 1x Code Division Multiplexing (1x-CDM). The largest throughput gains are expected for strong users operating in time (or frequency)-orthogonal systems The above method and apparatus may be applied to a variety of applications. For example, when applied to the Voice-Over-Internet Protocol (VoIP), the inventive superposition coding on the 1x-EV-DO forward link may allow for lower latencies (reduced transmission delays), a greater number of users per sector (namely, a higher capacity), or a combination of the two. When applied to broadcast services such as advertising, the broadcast services may be superposition coded with unicast traffic directed to an individual user so that both broadcast and unicast traffic may be transmitted together. Thus, unlike conventional wireless communication systems, the present invention minimizes or eliminates the need to preempt broadcast traffic with unicast traffic. In other words, broadcast traffic need not be compromised during periods of unicast traffic for those systems employing the present method and apparatus.

While the present method and apparatus has been described with reference to numerous specific details, one of ordinary skill in the art will recognize that the invention may be embodied in other specific forms without departing from the spirit of the invention. Thus, one of ordinary skill in the art would understand that the invention is not to be limited by the foregoing illustrative details, but rather is to be defined by the appended claims. On the same note, the modulation formats of CDMA and OFDM were used as examples. The data packets can be constructed conforming to any wireless communication standard.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Moreover, method steps may be interchanged without departing from the scope of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may be read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or utilize the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The power allocation ($\alpha_i$) to the various users can be indicated in a variety of methods. One means is to partition the range (0,1) into a number of smaller levels and indicate the level which best approximates the power allocation. Another method is to indicate the requested data rate (DRC) and the packet format utilized to convey the data. The mobile will then calculate the fraction of power allocated.

What is claimed is:

1. A method comprising:
   transmitting, by a transmitter, a superposition coded packet at a transmission power level,
   the superposition coded packet comprising:
   a preamble comprising at least one superposition coded packet parameter and at least one non-superposition coded packet parameter; and
   a payload comprising a first packet and a second packet, wherein the first packet is formatted in accordance with a first multiple access technique, wherein the second packet is formatted in accordance with a second multiple access technique that is different from the first multiple access technique, wherein the at least one superposition coded packet parameter includes power allocation information including a first fractional level of the transmission power level and a second fractional level of the transmission power level, wherein the first fractional level is allocated to the first packet and the second fractional level is allocated to the second packet, and wherein the first packet is transmitted at a first power level and the second packet is transmitted at a second power level.

2. The method of claim 1, wherein the payload further comprises a third packet formatted in accordance with a third multiple access technique.

3. The method of claim 1, wherein the first power level is different than the second power level.

4. The method of claim 1, wherein the first multiple access technique is based on a first wireless standard and wherein the second multiple access technique is based on a second wireless standard.

5. The method of claim 4, wherein one of the first wireless standard and the second wireless standard comprises an orthogonal frequency-division multiplexing (OFDM) or an orthogonal frequency-division multiple access (OFDMA) standard.

6. A computer readable non-transitory tangible medium storing a superposition coded packet for transmission at a transmission power level, the superposition coded packet comprising:
   a preamble comprising at least one superposition coded packet parameter and at least one non-superposition coded packet parameter; and
   a payload comprising a first packet and a second packet, wherein the first packet is formatted in accordance with a first multiple access technique, wherein the second packet is formatted in accordance with a second multiple access technique that is different from the first multiple access technique, wherein the at least one superposition coded packet parameter includes power allocation information including a first fractional level of the transmission power level and a second fractional level of the transmission power level, wherein the first fractional level is allocated to the first packet and the second fractional level is allocated to the second packet, and wherein the first packet is associated with a first power level and the second packet is associated with a second power level.

7. The computer readable non-transitory tangible medium of claim 6, wherein the payload further comprises a third packet formatted in accordance with a third multiple access technique.

8. The computer readable non-transitory tangible medium of claim 6, wherein the at least one superposition coded packet parameter comprises a number of packet oriented formats in the superposition coded packet, a length of the superposition coded packet, payload sizes associated with superposition coded packet users, or physical addresses associated with superposition coded packet users.

9. The computer readable non-transitory tangible medium of claim 6, wherein the at least one non-superposition coded packet parameter is determined by one or more of the first multiple access technique and the second multiple access technique.

10. The computer readable non-transitory tangible medium of claim 6, wherein the superposition coded packet comprises at least one higher layer in a time slot and at least one lower layer in the time slot, wherein the at least one lower layer in the time slot comprises broadcast traffic, and wherein the at least one higher layer in the time slot comprises unicast traffic directed to an individual user.

11. The computer readable non-transitory tangible medium of claim 10, wherein the broadcast traffic comprises information intended for a particular region.

12. An apparatus configured to:
   receive a superposition coded packet transmitted at a transmission power level, the superposition coded packet comprising:
      a preamble comprising at least one superposition coded packet parameter and at least one non-superposition coded packet parameter; and
      a payload comprising a first packet and a second packet, wherein the first packet is formatted in accordance with a first multiple access technique, wherein the second packet is formatted in accordance with a second multiple access technique that is different from the first multiple access technique, wherein the at least one superposition coded packet parameter includes power allocation information including a first fractional level of the transmission power level and a second fractional level of the transmission power level, wherein the first fractional level is allocated to the first packet and the second fractional level is allocated to the second packet, and wherein the first packet is associated with a first power level and the second packet is associated with a second power level; and
   store the superposition coded packet to a memory.

13. The apparatus of claim 12, further comprising a processor to process the first packet based on the first multiple access technique and to process the second packet based on the second multiple access technique.

14. The apparatus of claim 12, wherein the second power level is different from the first power level.

15. An apparatus, comprising:
   means for compiling a superposition coded packet for transmission at a transmission power level, the superposition coded packet comprising:
      a preamble comprising at least one superposition coded packet parameter and at least one non-superposition coded packet parameter; and
      a payload comprising a first packet and a second packet, wherein the first packet is formatted in accordance with a first multiple access technique, wherein the second packet is formatted in accordance with a second multiple access technique that is different from the first multiple access technique, wherein the at least one superposition coded packet parameter includes power allocation information including a first fractional level of the transmission power level and a second fractional level of the transmission power level, wherein the first fractional level is allocated to the first packet and the second fractional level is allocated to the second packet, and wherein the first packet is associated with a first power level and the second packet is associated with a second power level; and
   means for transmitting the superposition coded packet.

16. The apparatus of claim 15, wherein the first multiple access technique is based on a first wireless standard and wherein the second multiple access technique is based on a second wireless standard.

17. The apparatus of claim 15, wherein one of the first wireless standard and the second wireless standard comprises an orthogonal frequency-division multiplexing (OFDM) or an orthogonal frequency-division multiple access (OFDMA) standard.

18. The apparatus of claim 15, wherein the payload further comprises a third packet formatted in accordance with a third multiple access technique.

19. The apparatus of claim 15, wherein the superposition coded packet comprises at least one broadcast service layer.

20. The apparatus of claim 15, wherein the superposition coded packet comprises at least one unicast traffic layer.

21. A mobile device comprising:
a receiver configured to receive a packet and to identify the received packet as a superposition coded packet based on power allocation information that is included in a preamble of the received packet; and
at least one decoder configured to decode fractional power information, in response to identifying the received packet as the superposition coded packet, a first packet of the superposition coded packet in accordance with a first multiple access technique and to decode a second packet of the superposition coded packet in accordance with a second multiple access technique that is different from the first multiple access technique, wherein the first packet is associated with a first power level and the second packet is associated with a second power level.

22. The mobile device of claim 21, wherein the superposition coded packet comprises a data packet for a stronger user and a data packet for a weaker user.

23. The mobile device of claim 22, wherein the at least one decoder is further configured to treat the data packet for the stronger user as interference and to cancel the data packet for the stronger user treated as interference.

24. The mobile device of claim 22, wherein the at least one decoder is further configured to decode and subtract out the data packet for the weaker user from the superposition coded packet.

25. The mobile device of claim 21, wherein the first multiple access technique is based on a first wireless standard and wherein the second multiple access technique is based on a second wireless standard.

26. The mobile device of claim 25, wherein one of the first wireless standard and the second wireless standard comprises an orthogonal frequency-division multiplexing (OFDM) or an orthogonal frequency-division multiple access (OFDMA) standard.

27. The mobile device of claim 21, further comprising a transmitter.

28. The mobile device of claim 27, wherein the transmitter is configured to transmit data indicating a requested data rate (DRC) via a wireless channel.

29. The mobile device of claim 21, wherein the superposition coded packet is transmitted at a transmission power level, and further comprising logic configured to read a preamble of the superposition coded packet and calculate a fraction of the transmission power level that is allocated to the mobile device based on the power allocation information.

30. The mobile device of claim 29, wherein the at least one decoder is further configured to decode the superposition coded packet based on the calculated fraction of the transmission power level that is allocated to the mobile device.

31. A method, comprising:
receiving a superposition coded packet at an electronic device, wherein the superposition coded packet is transmitted at a transmission power level, wherein the superposition coded packet includes a first packet formatted in accordance with a first multiple access technique and a second packet formatted in accordance with a second multiple access technique that is different from the first multiple access technique, and wherein the first packet is associated with a first power level and the second packet is associated with a second power level;
reading a preamble of the superposition coded packet;
calculating a fraction of the transmission power level that is allocated to the first packet based on information read from the preamble of the superposition coded packet; and
decoding the superposition coded packet based on the calculated fraction of the transmission power level that is allocated to the electronic device.

32. The method of claim 31, wherein the superposition coded packet comprises a first data packet for a stronger user and a second data packet for a weaker user.

33. The method of claim 32, wherein decoding the superposition coded packet comprises treating the first data packet for the stronger user as interference and canceling the first data packet for the stronger user treated as interference.

34. The method of claim 32, wherein decoding the superposition coded packet comprises decoding and subtracting out the second data packet for the weaker user from the superposition coded packet.

35. The method of claim 31, wherein the information read from the preamble of the superposition coded packet includes a requested data rate and a packet format of the first packet.

36. A computer readable non-transitory tangible medium comprising instructions that, when executed by a processor, cause the processor to:
receive a superposition coded packet at an electronic device, wherein the superposition coded packet is transmitted at a transmission power level, wherein the superposition coded packet includes a first packet formatted in accordance with a first multiple access technique and a second packet formatted in accordance with a second multiple access technique, and wherein the first packet is associated with a first power level and the second packet is associated with a second power level;
read a preamble of the superposition coded packet;
calculate a fraction of the transmission power level that is allocated to the first packet based on information read from the preamble of the superposition coded packet; and
decode the first packet based on the calculated fraction of the transmission power level that is allocated to the first packet.

37. The computer readable non-transitory tangible medium of claim 36, further comprising instructions that, when executed by the processor, cause the processor to treat a data packet of the superposition coded packet that is intended for a stronger user as interference and cancel the data packet intended for the stronger user treated as interference.

38. A mobile device, comprising:
means for receiving a superposition coded packet, wherein the superposition coded packet is transmitted at a transmission power level, wherein the superposition coded packet includes a first packet formatted in accordance with a first multiple access technique and a second packet formatted in accordance with a second multiple access technique, and wherein the first packet is associated with a first power level and the second packet is associated with a second power level;
means for reading a preamble of the superposition coded packet;
means for calculating a fraction of a transmission power level that is allocated to the first packet and to the second packet based on information read from the preamble of the superposition coded packet;

means for decoding the first packet of the received superposition coded packet in accordance with the first multiple access technique; and
means for decoding the second packet of the received superposition coded packet in accordance with the second multiple access technique.

39. The mobile device of claim 38, wherein the first multiple access technique is different from the second multiple access technique.

40. The mobile device of claim 21, wherein the packet is transmitted at a transmission power level, wherein the power allocation information includes a first fractional level of the transmission power level and a second fractional level of the transmission power level, and wherein the first fractional level is allocated to the first packet and the second fractional level is allocated to the second packet.

* * * * *